(12) United States Patent
Lei et al.

(10) Patent No.: US 11,743,848 B2
(45) Date of Patent: Aug. 29, 2023

(54) RADIO RE-SYNCHRONIZATION SIGNAL

(71) Applicant: QUALCOMM Incorporated, San Diego, CA (US)

(72) Inventors: Jing Lei, San Diego, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/374,763

(22) Filed: Jul. 13, 2021

(65) Prior Publication Data
US 2022/0022147 A1    Jan. 20, 2022

Related U.S. Application Data

(60) Provisional application No. 63/054,156, filed on Jul. 20, 2020.

(51) Int. Cl.
*H04W 56/00* (2009.01)
*H04W 24/10* (2009.01)
(Continued)

(52) U.S. Cl.
CPC ......... *H04W 56/001* (2013.01); *H04W 24/10* (2013.01); *H04W 72/0446* (2013.01);
(Continued)

(58) Field of Classification Search
CPC .............. H04W 56/001; H04W 24/10; H04W 72/0446; H04W 72/0453; H04W 72/0466; H04W 72/1263
(Continued)

(56) References Cited

U.S. PATENT DOCUMENTS 10,542,505 B2 * 1/2020 Si ............................ H04L 5/005
10,764,847 B2 * 9/2020 Vos ..................... H04W 56/001
(Continued)

FOREIGN PATENT DOCUMENTS

WO    2019245199 A1    12/2019

OTHER PUBLICATIONS

R2-1904644, "RSS for measurement improvements in LTE-M" (Year: 2019).*
(Continued)

*Primary Examiner* — Intekhaab A Siddiquee
(74) *Attorney, Agent, or Firm* — Loza & Loza, LLP/Qualcomm

(57) ABSTRACT

Aspects provide for wireless communication between a UE and a radio access network (RAN) node in a wireless communication network. The RAN node may generate a re-synchronization signal (RSS) for a bandwidth part (BWP) of a plurality of BWPs and transmit the RSS in the BWP of a downlink to the UE. A first bandwidth of the RSS may be based on a second bandwidth of the BWP. The UE may receive the RSS in different RRC states and perform a measurement of the RSS for synchronization, for an early detection of a paging or wake-up signal, and/or for radio resource management (RRM) measurements or radio link monitoring (RLM) measurements. The UE may utilize a communication link with the RAN node based on the measurement and the RAN node may utilize the communication link to communicate with a group of UEs sharing at least one same RSS beam.

34 Claims, 17 Drawing Sheets

(51) Int. Cl.
*H04W 72/0446* (2023.01)
*H04W 72/0453* (2023.01)
*H04W 72/044* (2023.01)
*H04W 72/1263* (2023.01)

(52) U.S. Cl.
CPC ... *H04W 72/0453* (2013.01); *H04W 72/0466* (2013.01); *H04W 72/1263* (2013.01)

(58) Field of Classification Search
USPC .......................................................... 370/503
See application file for complete search history.

(56) References Cited

U.S. PATENT DOCUMENTS

| 2019/0149305 | A1 | 5/2019 | Zhou et al. | |
| 2019/0268904 | A1* | 8/2019 | Miao | H04W 52/02 |
| 2019/0349815 | A1* | 11/2019 | Tiirola | H03J 7/00 |
| 2019/0363843 | A1* | 11/2019 | Gordaychik | H04W 52/58 |
| 2021/0083730 | A1 | 3/2021 | Hwang et al. | |
| 2021/0306888 | A1* | 9/2021 | Kim | H04W 56/00 |

OTHER PUBLICATIONS

R2-1903825, "Use of RSS for measurement improvements" (Year: 2019).*
R2-1904512, "Signaling Configuration of RSS" (Year: 2019).*
International Search Report and Written Opinion—PCT/US2021/041627—ISA/EPO—dated Feb. 7, 2022.
Partial International Search Report—PCT/US2021/041627—ISA/EPO—dated Dec. 1, 2021.

* cited by examiner

RADIO RE-SYNCHRONIZATION SIGNAL

CROSS-REFERENCE TO RELATED APPLICATIONS

The present application for patent claims priority to and the benefit of U.S. Provisional Application No. 63/054,156, titled "NEW RADIO RE-SYNCHRONIZATION SIGNAL" filed Jul. 20, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to synchronization and measurement techniques between a user equipment and base station.

INTRODUCTION

In fifth generation (5G) wireless communication networks, such as the New Radio (NR) wireless communication network, a user equipment (UE) may perform a cell search to acquire time and frequency synchronization with the cell and to identify the physical cell identity (PCI) of the cell. The PCI may be carried in a primary synchronization signal (PSS) and secondary synchronization signal (SSS) of a synchronization signal block (SSB). The SSB, which includes the PSS, the SSS, and a physical broadcast control channel (PBCH) may be transmitted, for example, over four symbols in the time domain and 240 subcarriers in the frequency domain. PSS and SSS sequence may be mapped to a first symbol and a third symbol of the SSB and may occupy the center 12 resource blocks (RBs). Multiple SSBs may be transmitted within an SSB burst and each SSB may be beamformed towards a pre-configured direction. A maximum number of SSBs within an SSB burst may depend on the frequency range.

In current NR specifications, a base station may configure a measurement gap for a UE to perform SSB-based radio resource management (RRM)/radio link monitoring (RLM) measurements. The use of a measurement gap in NR may depend on the capability of the UE, the active bandwidth part (BWP) of the UE, and the current operating frequency. In NR, measurements gaps might be used for intra-frequency, inter-frequency, and inter-RAT measurements. In some cases, intra-frequency measurements in NR might use a measurement gap, for example, if the intra-frequency measurements are to be done outside of the active BWP. Current NR specifications may not be adaptive to a UEs capabilities including BWP resource allocation capability and may be overly complex for handling measurement gap and PBCH decoding.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method for wireless communication at a user equipment (UE) in a wireless communication network is provided. The method includes receiving, from a radio access network (RAN) node, a re-synchronization signal (RSS) in a downlink (DL) bandwidth part (BWP) of a plurality of BWPs. A first bandwidth and first time duration of the RSS may be based on a second bandwidth and a second time duration of the DL BWP. The method also includes performing a measurement of the RSS. The method further includes utilizing a communication link with the RAN node based on the measurement.

A method for wireless communication at a Radio Access Network (RAN) node in a wireless communication network is provided. The method includes generating a re-synchronization signal (RSS) for a bandwidth part (BWP) of a plurality of BWPs. The method also includes transmitting the RSS in the BWP of a downlink (DL) to a user equipment (UE). A first bandwidth of the RSS may be based on a second bandwidth of the BWP. The method further includes utilizing a communication link with the UE based on the RSS. The utilizing the communication link with the UE based on the RSs comprises at least one of receiving, from the UE, a measurement report based on a measurement of the RSS, receiving, from the UE, an indication of an adjustment of a tracking loop based on the measurement of the RSS, or receiving, from the UE, an indication of an update of one or more reception or transmission parameters based on the measurement of the RSS.

A wireless communication device in a radio access network (RAN) of a wireless communication system is provided. The wireless communication device includes a wireless transceiver, a memory, and a processor. The processors is communicatively coupled to the wireless transceiver and the memory. The processor is configured to receive, from a radio access network (RAN) node, a re-synchronization signal (RSS) in a downlink (DL) bandwidth part (BWP) of a plurality of BWPs. A first bandwidth and first time duration of the RSS may be based on a second bandwidth and a second time duration of the DL BWP. The processor is also configured to perform a measurement of the RSS. The processor is further configured to utilize a communication link with the RAN node based on the measurement.

A radio access network (RAN) node in a wireless communication system is provided. The RAN node includes a wireless transceiver, a memory, and a processor. The processors is communicatively coupled to the wireless transceiver and the memory. The processor is configured to generate a re-synchronization signal (RSS) for a bandwidth part (BWP) of a plurality of BWPs. The processor is also configured to transmitting the RSS in the BWP of a downlink (DL) to a user equipment (UE). A first bandwidth of the RSS may be based on a second bandwidth of the BWP. The processor is further configured to utilize a communication link with the UE based on the RSS. The utilizing the communication link with the UE based on the RSs comprises at least one of receiving, from the UE, a measurement report based on a measurement of the RSS, receiving, from the UE, an indication of an adjustment of a tracking loop based on the measurement of the RSS, or receiving, from the UE, an indication of an update of one or more reception or transmission parameters based on the measurement of the RSS.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
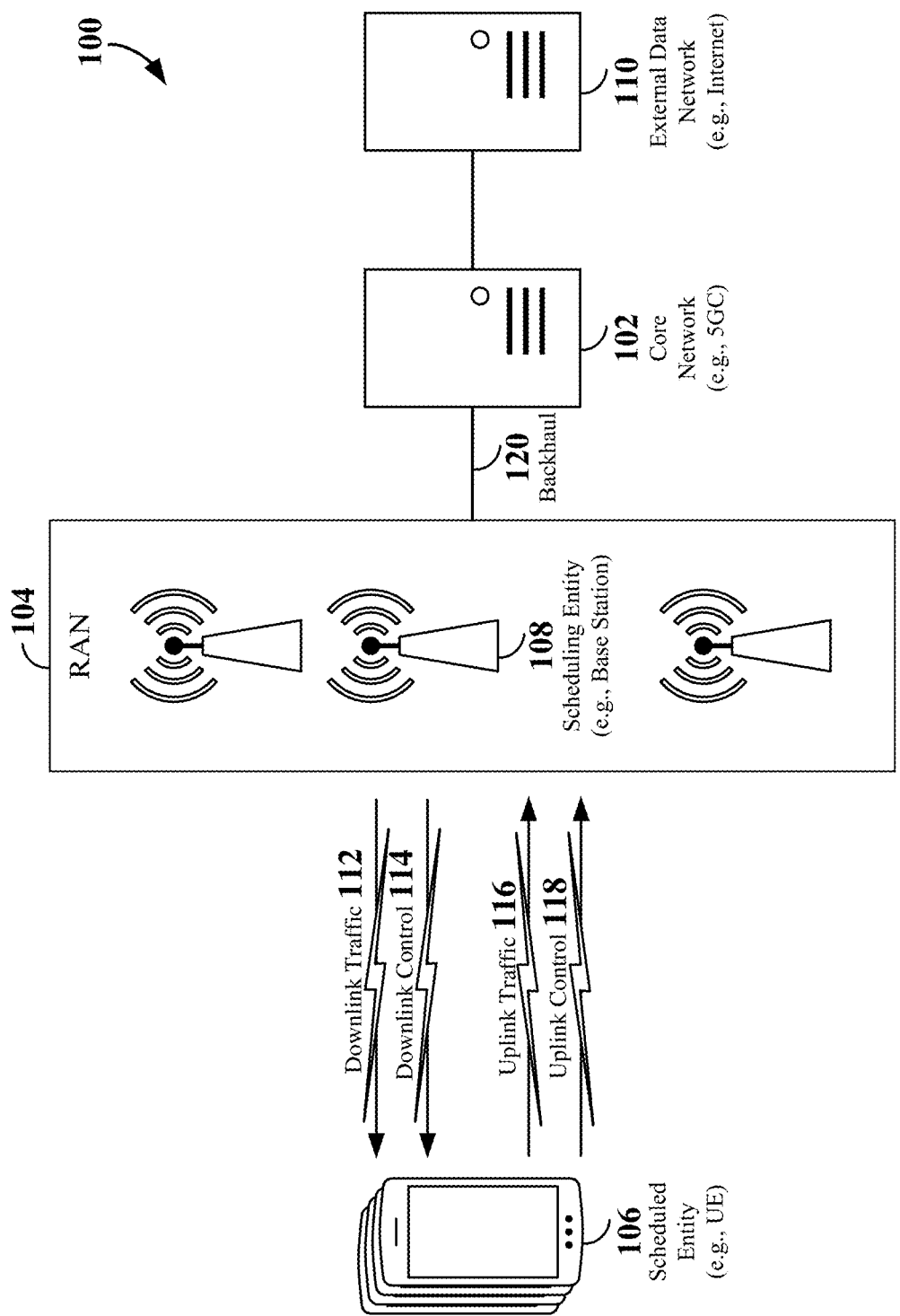
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated and disaggregated arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Fifth generation (5G) wireless communication networks, such as the New Radio (NR) wireless communication network, support communication between a base station 108 and high-end UEs 106 for a plurality of different usage cases, including, for example, enhanced mobile broadband (eMBB) and ultra-reliable and low latency communication (URLLC). NR networks may further support communication between a base station and low-end UEs 106 in massive machine-type communication (mMTC) usage cases. In some examples, LTE-M or Narrowband Internet of Things (NB-IoT) technology may be utilized to meet the requirements of mMTC.

In addition to providing services to high-end UEs 106 (e.g., via eMMB and/or URLLC) and low-end UEs 106 (e.g., via mMTC), NR networks may further provide services to reduced capability UEs 106. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

In certain aspects, a UE may be a reduced capability (RedCap) UE with relaxed peak throughput, latency, and reliability requirements. To achieve power savings, a RedCap UE may switch to a narrow-band bandwidth part (BWP) and stay in a discontinuous reception (DRX) mode. The RedCap UE may hop to a BWP that does not include SSB to compensate for coverage losses due to their reduced capabilities.

The particular services (e.g., eMBB/URLLC/mMTC/reduced capability) provided to a UE may be determined based on a UE category of the UE. UE category information is used to enable the base station to effectively communicate with each UE served by the base station. For example, the UE category may identify the uplink and downlink performance capability of the UE. As an example, the UE category may specify the maximum data rate supported by the UE, the number of component carriers and multiple-input multiple-output (MIMO) layers supported by the UE, and/or the highest modulation supported by the UE. The examples presented herein of UE category differentiators are merely exemplary, and it should be understood that any suitable differences between UE features, whether in hardware or software, may be utilized to differentiate between UE categories.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
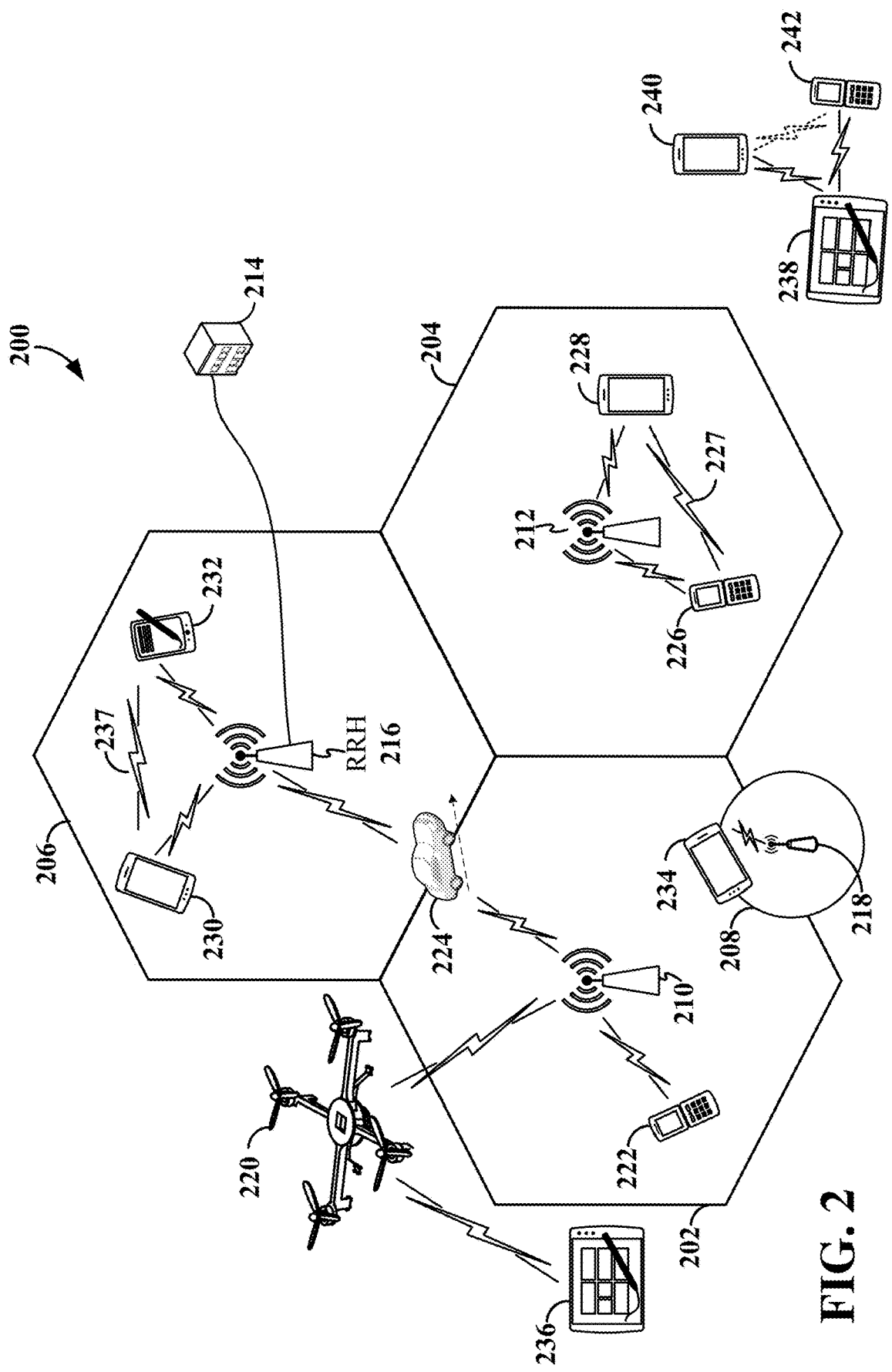
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
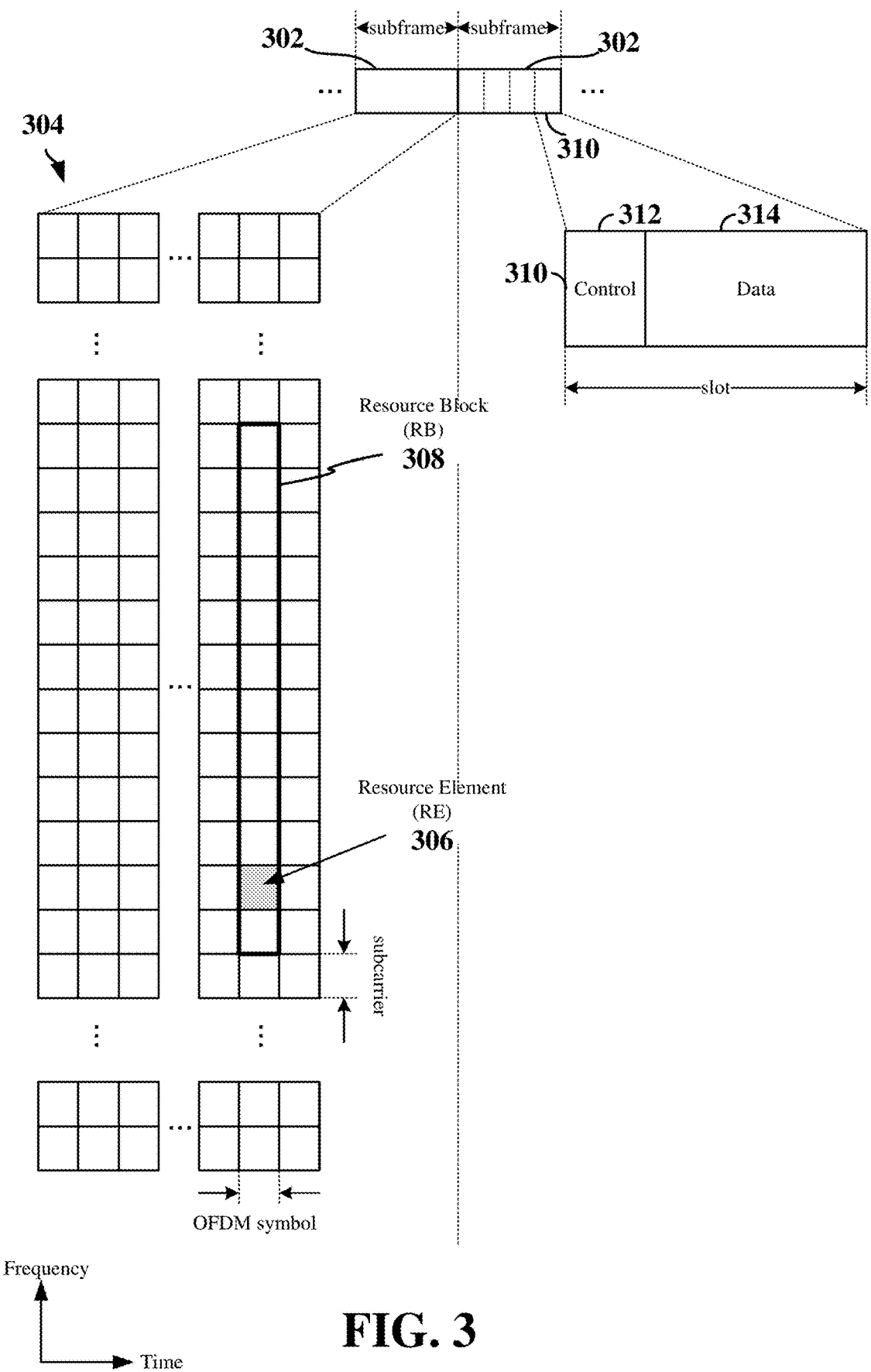
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Generally, BWPs are configured as a subset or a part of total carrier bandwidth. A BWP forms a set of contiguous common resource blocks (CRBs) within the full component carrier bandwidth. In other words, within the carrier bandwidth, a BWP starts at a CRB and may span over a set of consecutive CRBs. Each BWP may be associated with its own numerology (sub-carrier spacing (SCS) and cycling prefix (CP)). A UE may be configured with up to four downlink BWPs and up to four uplink BWPs for each serving cell. In the case of supplementary uplink (SUL), there can be up to four additional uplink BWPs on the SUL carrier.

To enable reasonable UE battery consumption, only one BWP in the downlink and one in the uplink, are generally active at a given time on an active serving cell under typical operation. The active BWP defines the UE's operating bandwidth within the cell's operating bandwidth, and all other BWPs that the UE is configured with are deactivated. On deactivated BWPs, the UE does not transmit or receive any data.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
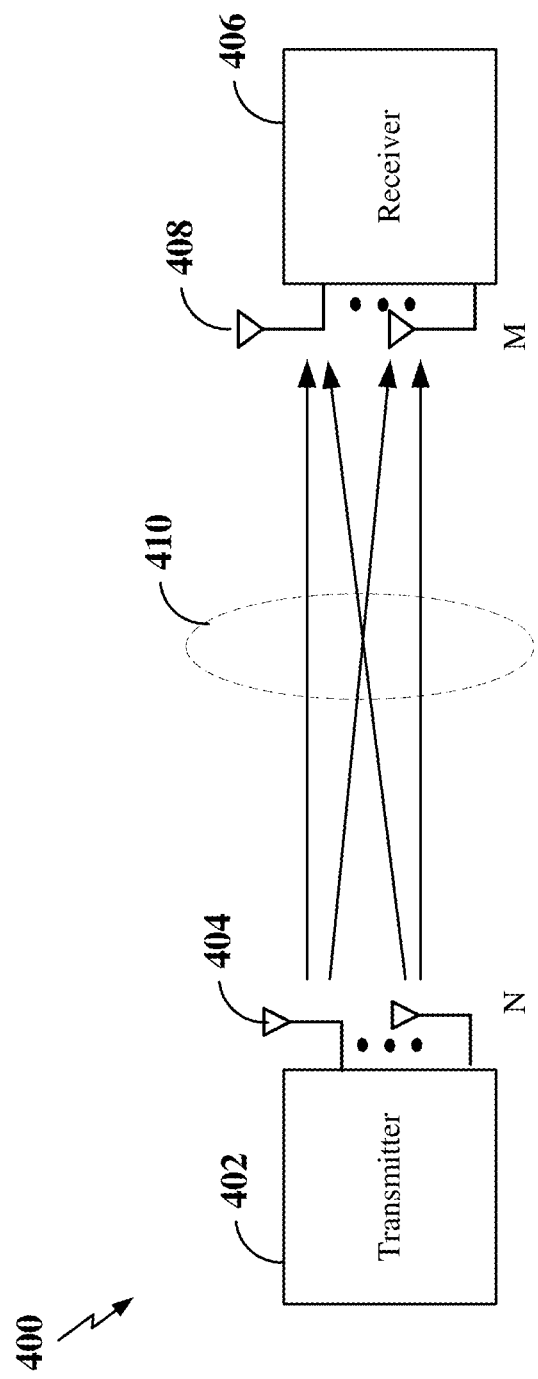
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 5:
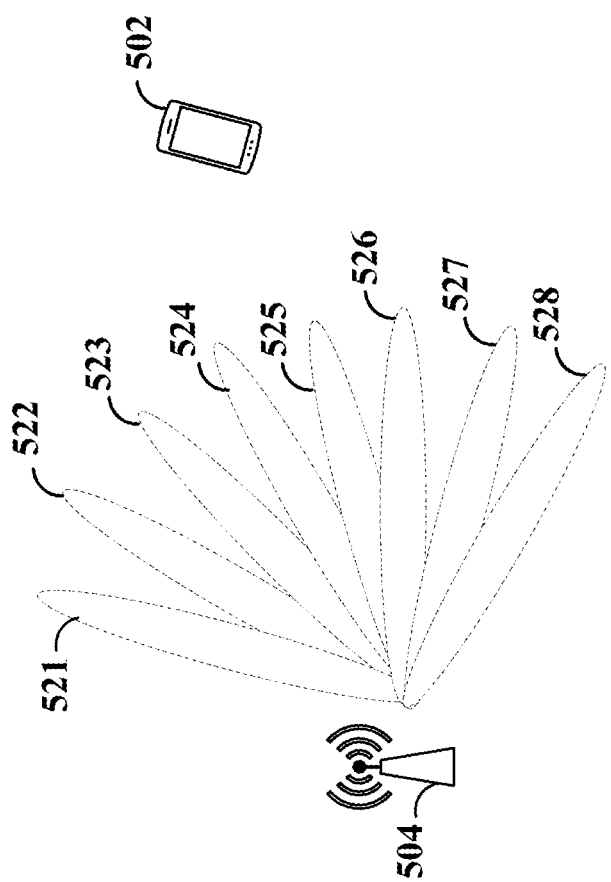
FIG. 5 is a diagram illustrating communication between a radio access network (RAN) node and a wireless communication device using downlink beamformed signals according to some aspects.

FIG. 5 is a diagram illustrating communication between a radio access network (RAN) node 504 and a wireless communication device 502 using downlink beamformed signals according to some aspects. The RAN node 504 may be any of the base stations or scheduling entities illustrated in FIGS. 1 and 2, and the wireless communication device 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as a SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)).

The wireless communication device 502 searches for and identifies the beams based on the beam reference signals. The wireless communication device 502 then performs beam measurements (e.g., RSRP, SINR, RSRQ, etc.) on the beam reference signals to determine the respective beam quality of each of the beams. In examples in which the wireless communication device 502 is in a RRC connected state, the wireless communication device 502 may generate and transmit an L1 measurement report, including the respective beam identifier (beam index) and beam measurement of one or more of the beams 521-528 to the RAN node 504. The RAN node 504 may then determine the downlink beam (e.g., beam 524) on which to transmit unicast downlink control information and/or user data traffic to the wireless communication device 502. In some examples, the selected downlink beam has the highest gain from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the wireless communication device 502. In some examples, the RAN node 504 may derive the downlink beam based on a combination of the L1 measurement report and uplink measurements.

In examples in which the wireless communication device 502 is a RRC idle state, the wireless communication device 502 may use the beam measurements to select a downlink beam on which to receive broadcast communications from the RAN node 504. The broadcast communications may include, for example, paging messages transmitted from the RAN node 504 to the wireless communication device 502 when new data arrives for the wireless communication device 502 at the network. In some examples, a paging message may be broadcast by the RAN node 504 over multiple downlink beams. The paging message may then be received by the wireless communication device 502 on the selected downlink beam.

In addition to L1 measurement reports, the wireless communication device 502 can further utilize the beam reference signals to estimate the channel quality of the channel between the RAN node 504 and the wireless communication device 502. For example, the wireless communication device may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

The RAN node 504 and wireless communication device 502 may support different types of CSI reports (including L1 measurement reports) and/or different types of measurements. For example, self-contained CSI (e.g., CSI is transmitted back to the RAN node 504 in the same slot as the CSI-RS is transmitted from the RAN node) or non-self-contained CSI (e.g., CSI is transmitted back to the RAN node 504 in a later slot than the slot in which the CSI-RS is transmitted from the RAN node) may be supported. To distinguish between the different report/measurement types and measurement configurations, CSI-RS pilots may be mapped to specific resource elements (REs) and ports for each of the report/measurement types and report/measurement configurations.

In certain aspects, beamformed SSBs may also be used by UEs for RRM/RLM measurements. However, SSBs may not be transmitted in each BWP. For example, to achieve power savings, a UE, such as a RedCap UE operating in discontinuous reception (DRX) mode, may switch to a narrowband (NB) BWP that does not include an SSB. As another example, to compensate for coverage loss due to a reduced number of antennas, bandwidth limitations, or receiver chain design limitations, a RedCap UE may hop to a NB BWP that does not include an SSB. Thus, for some UEs, such as RedCap UEs or UEs with stringent power savings requirements, the current 3GPP NR specifications for RRM/RLM measurements and PDCCH-based wake-up signals (WUSs) may not be optimal. In general, PDCCH based WUSs for UEs operating in DRX mode may not be useful for the time/frequency tracking and RRM/RLM measurements. Therefore, a UE operating in a NB BWP that does not include an SSB may need to switch to a BWP including an SSB to perform RRM/RLM measurements. A base station (gNB) may configure a measurement gap for a UE in an idle mode, an inactive mode, or in a connected mode to switch from a NB BWP lacking an SSB to another BWP carrying an SSB to perform SSB-based RRM/RLM measurements. However, for RedCap UEs and other UEs with stringent power savings requirements, configuring such UEs with a measurement gap and having the UEs to perform BWP switching to obtain RRM/RLM measurements increases the UE complexity and reduces the power efficiency of the UEs. Moreover, for SSB-based RRM/RLM measurements, the UE may need to decode the PBCH to derive the beam index, further increasing the UE complexity. In addition, RedCap UEs may benefit from signal repetition to improve diversity gain. However, SSB repetition is not supported in an SSB burst for cell-edge UEs.

Therefore, in various aspects, a new type of reference signal, referred to herein as a re-synchronization signal (RSS), may be generated and transmitted in each BWP, including NB BWPs. The RSS may be adaptive to the UE capability and the UE resource allocation per BWP. For example, the RSS may have a length that is adaptive according to the BWP configuration. Thus, a respective RSS may be configured for each BWP, including BWPs that may also carry an SSB. A UE may utilize the RSS to achieve radio frame, subframe, slot, and symbol synchronization in the time domain, identify the center of the channel (system) bandwidth in the frequency domain, identify the physical cell identity (PCI) of the cell, perform RRM/RLM measurements, and/or perform channel state information (CSI) reporting. As such, a UE no longer needs to be configured with a measurement gap to switch to a BWP including an SSB to perform RRM/RLM measurements, thus providing power savings and reducing the UE complexity. In some examples, the RSS may include information indicated in a primary synchronization signal (PSS) and information indicated in a secondary synchronization signal (SSS). Since the RSS is sequence-based, the UE does not need to perform PBCH decoding, thus simplifying the UE complexity. In addition, the UE may re-use the UE's receiver chain (e.g., hardware and firmware) for PSS/SSS detection in order to detect the RSS. In some examples, the RSS may be combined with a WUS or paging signal, thus further simplifying the UE complexity.

Figure 6:
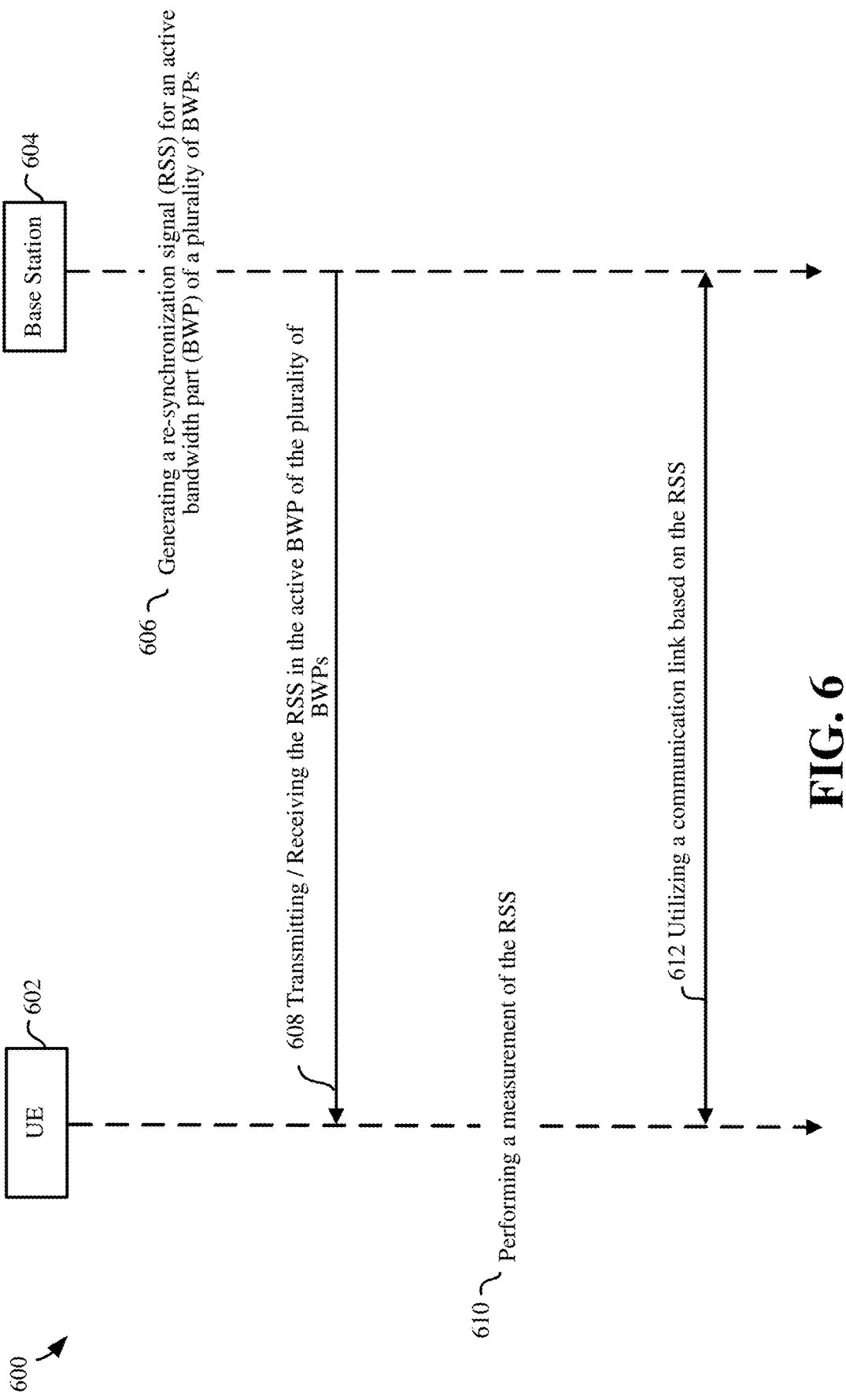
FIG. 6 is a signaling diagram illustrating exemplary signaling in a wireless communication network for generating and utilizing a re-synchronization signal (RSS) according to some aspects.

FIG. 6 is a signaling diagram illustrating exemplary signaling in a wireless communication network 600 for generating and utilizing a re-synchronization signal (RSS) according to some aspects. Wireless communication networks may include a user equipment (UE) 602 and a base station 604. The UE 602 may correspond to any of the UEs or scheduled entities illustrated in FIG. 1, 2, 4, or 5. In addition, the base station 604 may correspond to any of the base stations (e.g., eNBs or gNBs), scheduling entities, or more generally, radio access network (RAN) nodes, illustrated in FIG. 1, 2, 4, or 5. In some examples, the UE may be a reduced capability (RedCap) UE as described herein.

In operation 606, a base station 604 may generate an RSS for an active bandwidth part (BWP) of a plurality of BWPs. In some aspects, the active BWP excludes an SSB. The bandwidth of the RSS may be based on a bandwidth of the active BWP. In certain aspects, a bandwidth of the RSS may be scalable to a bandwidth of the active BWP. For example, a first active BWP may have a bandwidth that is larger than a bandwidth of a second active BWP. An RSS generated for transmission in the first active BWP may be larger than an RSS generated for transmission in the second active BWP. Conversely, an RSS generated for transmission in the second active BWP may be smaller than an RSS generated for transmission in the first active BWP. In certain aspects, a bandwidth of the RSS may be scalable in proportion to a bandwidth of the active BWP. For example, a first active BWP may have a bandwidth that is twice as large as a bandwidth of a second active BWP. An RSS generated for transmission in the first active BWP may be twice as large as an RSS generated for transmission in the second active BWP. Conversely, an RSS generated for transmission in the second active BWP may be twice as small as an RSS generated for transmission in the first active BWP. FIG. 7, described further herein, illustrates exemplary circuitry 700 with a base station for generating of an RSS.

Figure 10:
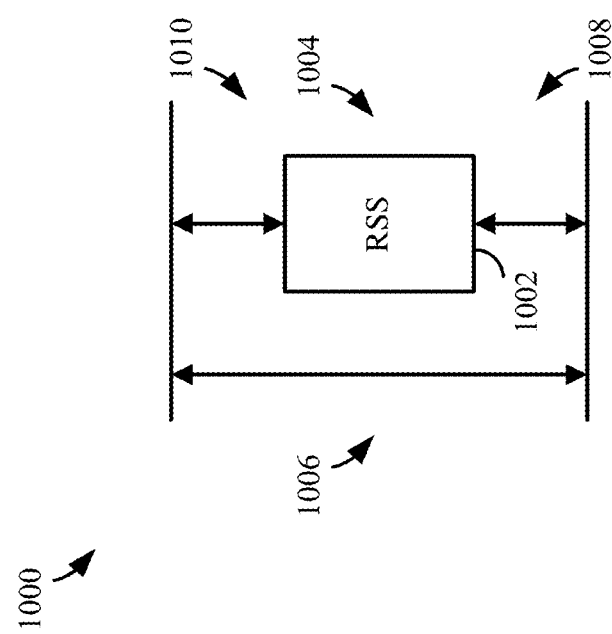
FIG. 10 illustrates an exemplary diagram of an RSS according to some aspects.

In operation 608, the base station 604 may transmit the RSS in the active BWP of the plurality of BWPs. For example, the base station 604 may transmit the RSS in the active BWP of the plurality of BWPs and the UE 602 may receive the RSS in the active BWP of the plurality of BWPs. In certain aspects, the RSS may be transmitted in a single symbol or multiple symbols of a slot. In some aspects, the RSS may be received in a pre-configured frequency raster associated with the active BWP. In certain aspects, the RSS may be transmitted in a set of consecutive resource block (RB) in the active BWP. In some aspects, the RSS may be transmitted on a set of symbols within a set of slots configured by the RAN node. In some aspects, a time duration of the RSS is based on an active time of the active downlink BWP. FIG. 10, described further herein, illustrates an exemplary diagram of an RSS.

In certain aspects, before the base station 604 transmits the RSS in the active BWP of the plurality of BWPs, the base station 604 may transmit at least one of a system information block (SIB) message or a radio resource control (RRC) message identifying a power offset of the RSS with respect to a synchronization signal block (SSB) reference signal. The base station 604 may subsequently transmit the RSS in the active BWP of the plurality of BWPs and with an increased power relative to a power of the SSB reference signal based on the power offset.

As described herein, the base station 604 may transmit the RSS on one or more RSS beams such as a first RSS beam and a second RSS beam. The base station 604 may transmit each of the one or more RSS beams by quasi co-locating (QCL'ing) each of the one or more RSS beams with an SSB beam or a CSI-RS beam. In some aspects, the RSS beams may be transmitted periodically or semi-statically, and the periodicities may be pre-configured by the base station 604 or other network entity and indicated in system information (SI) or dedicated RRC signaling. The base station 604 may transmit repetitions of the same RSS sequence on a same RSS beam of the one or more RSS beams in an RSS slot of a plurality of RSS slots. Each of the repetitions may be time-division multiplexed in the RSS slot. In some aspects, the repetitions of the RSS sequence may be transmitted in consecutive symbols of the RSS slot. The base station 604 may further transmit the RSS in at least one RSS slot of a plurality of slots. The at least one RSS slot may be pre-configured for the active BWP.

In some aspects, the base station 604 may transmit at least one of a system information block (SIB) message or a radio resource control (RRC) message identifying the at least one RSS slot for the active BWP. For example, the base station 604 may transmit an RSS in at least one RSS slot of a plurality of slots. Before transmitting the RSS, the base station 604 may transmit at least one of an SIB message or an RRC message identifying the at least one RSS slot for the active BWP.

In operation 610, the UE 602 may perform a measurement of the RSS. In some aspects, the UE 602 may receive the RSS in an active BWP of the plurality of BWPs and, after receiving the RSS, perform a measurement of the RSS. For example, the UE 602 may perform one or more RRM or RLM measurements using the RSS. The UE 602 may further perform L1-RSRP or L1-SINR beam measurements and/or CSI measurements. In some aspects, after performing the measurement of the RSS, the UE 602 may further utilize the measurement of the RSS for radio resource management or radio link monitoring in different radio resource control (RRC) states of the UE and combine the measurement of the RSS with a paging signal or a wake-up signal detection of the UE. In some aspects, after performing the measurement of the RSS, the UE 602 may utilize the measurement of the RSS for radio resource management (RRM) or radio link monitoring (RLM) in different radio resource control (RRC) state of the UE 602 based on a measurement object (e.g., configuration information) and a measurement report configuration. The UE 602 may also combine the measurement of the RSS with a paging signal or a wake-up signal detection of the UE 602. For example, the UE 602 may select a tracking loop for receiving and measuring the RSS based on a received measurement object. As another aspect, the UE 602 may measure the RSS using one or more resource elements and/or one or more slots based on a received measurement object. As yet another aspect, the UE may measure an RSS and provide the measurement of the RSS to the scheduling entity in accordance with a measurement report.

It should be understood that a measurement object may include a list of one or more objects on which a UE shall perform measurements. For intra-frequency and inter-frequency measurements, a measurement object may indicate the frequency and/or time location and subcarrier spacing of reference signals to be measured. Associated with this measurement object, the network may configure a list of cell specific offsets, a list of 'blacklisted' cells and a list of 'whitelisted' cells. Blacklisted cells may not be applicable in event evaluation or measurement reporting. Whitelisted cells may be the only ones applicable in event evaluation or measurement reporting. The measObjectId of the MO which corresponds to each serving cell may be indicated by servingCellMO within the serving cell configuration. For inter-RAT E-UTRA measurements, a measurement object may be a single E-UTRA carrier frequency. Associated with this E-UTRA carrier frequency, the network may configure a list of cell specific offsets, a list of 'blacklisted' cells and a list of 'whitelisted' cells. Blacklisted cells may not be applicable in event evaluation or measurement reporting. Whitelisted cells may be the only ones applicable in event evaluation or measurement reporting. For inter-RAT UTRA-FDD measurements, a measurement object may be a set of cell on a signal UTRA-FDD carrier frequency. For CBR measurement of NR sidelink communications, a measurement object may be a set of transmission resource pool(s) on a single carrier frequency for NR sidelink communication. For CLI measurements, a measurement object may indicate a frequency and/or a time location of SRS resources and/or CLI-RSSI resources, and subcarrier spacing of SRS resources to be measured.

It should be understood that a reporting configuration (e.g., a measurement report) may be include a reporting criterion, an RS type, a reporting format, and the like. Reporting criterion may include a criterion that triggers the UE to send a measurement report, for example, periodically or a single event description. An RS type may include an RS that the UE may use for beam and cell measurement results (e.g., SS/PBCH block or CSI-RS). A reporting format may include quantities per cell and/or per beam that the UE may include in the measurement report (e.g., RSRP) and other associated information such as the maximum number of cell and the maximum number of beams per cell to report. In case of conditional reconfiguration, each configuration may include an execution criteria, an RS type, and the like. An execution criteria may include a criteria that the UE uses for condition reconfiguration execution. An RS type may include an RS that the UE uses for obtaining beam and cell measurement results (SS/PBCH block-based or CSI-RS-based), used for evaluating conditional reconfiguration execution condition.

In should be understood that a measurement identity may include that, for measurement reporting, a list of measurement identities where each measurement identity links one measurement object with one reporting configuration. By configuring multiple measurement identities, it may be possible to link more than one measurement object to the same reporting configuration, as well as to link more than one reporting configuration to the same measurement object. The measurement identity may also be included in the measurement report that triggered the reporting, serving as a reference to the network. For conditional reconfiguration triggering, one measurement identity may link to exactly one conditional reconfiguration trigger configuration. It some aspects, up to 2 measurement identities may be linked to one conditional reconfiguration execution condition.

In operation 612, the UE 602 may utilize a communication link with the base station 604 based on the measurement. Similarly, the base station 604 may utilize a communication link with the UE 602 based on the RSS. In some examples, utilizing a communication link with the base station 604 based on the measurement may include at least one of the UE 602 receiving a measurement object (e.g., configuration information) and a measurement report configuration for the RRS, the UE 602 transmitting a measurement report, such as a CSI report, generated based on the RSS measurement(s) to the base station 604, the UE 602 adjusting tracking loops based on the measurement, or the updating one or more reception or transmission parameters based on the measurement. The CSI report may include an L1 beam measurement report or CSI parameters (e.g., CQI, PMI, RI, etc.) based on the CSI reporting configuration of the UE. The base station 604 may use the CSI report to adapt transmissions to current channel conditions. For example, the base station 604 may select one or more beams, a rank, an MCS, a precoding matrix, etc. based on the CSI report.

In some examples, utilizing a communication link with the base station 604 based on the measurement may include the UE 602 adjusting tracking loops of the UE 602 based on the measurement. Examples of tracking loops may include time tracking loops (TTLs), frequency tracking loops (FTLs), power delay profile estimation loops, and/or automatic gain control (AGC) loops. In some examples, utilizing a communication link with the base station 604 based on the measurement may include the UE 602 updating one or more receiving or transmitting parameters of the UE in the active and power savings modes based on the RSS measurement. Receiving and/or transmitting parameters may include, for example, transmit power, modulation type, or the like. Updating the one or more receiving or transmitting parameters may include adjusting or changing one or more receiving and/or transmitting parameters. Additionally, or alternatively, updating the one or more receiving or transmitting parameters may include verifying or determining that the one or more receiving and/or transmitting parameters are up-to-date.

In certain aspects, after the UE 602 receives the RSS in the active BWP, the UE 602 may identify another active BWP of the plurality of BWPs. The UE 602 may switch from the active BWP to the other active BWP. Subsequently, the UE 602 may receive another RSS of the other active BWP. Upon receiving the other RSS, the UE 602, and the base station 604 may perform the operations 608, 610 and 612 described herein based on the other RSS.

Figure 7A:
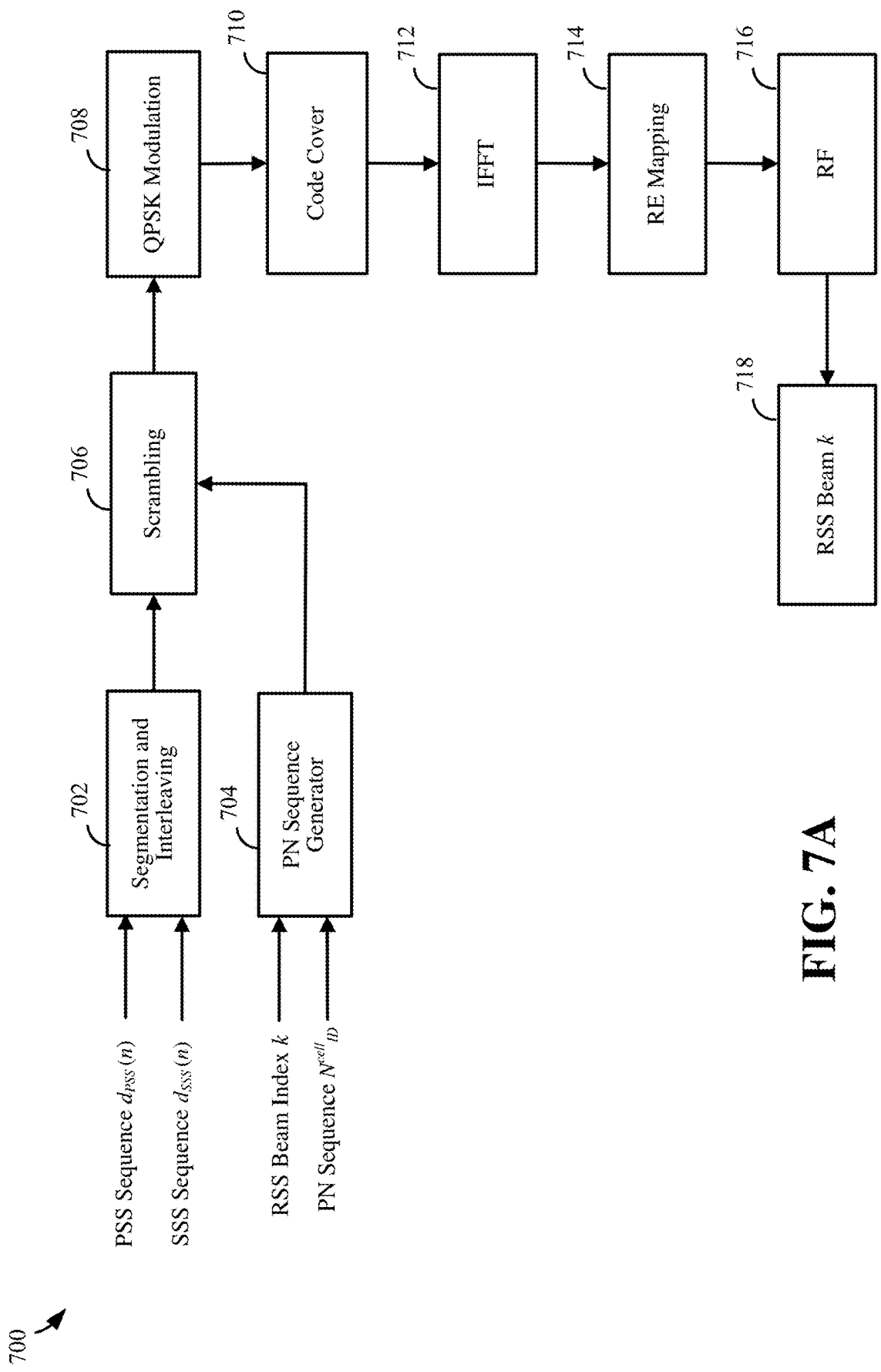
FIG. 7A is a diagram illustrating exemplary circuitry within a base station for generation of an RSS according to some aspects.

FIG. 7A is a diagram illustrating exemplary circuitry 700 within a base station for generation of an RSS according to some aspects. The circuitry 700 includes segmentation and interleaving circuitry 702, a pseudorandom number (PN) sequence generator 704, scrambling circuitry 706, a quadrature phase shift keying (QPSK) modulator 708, code cover circuitry 710, inverse fast Fourier transform (IFFT) circuitry 712, mapping circuitry 714, radio frequency (RF) circuitry 716, and beamforming circuitry 718. In certain aspects, the RSS may include an RSS sequence generated from a base sequence. The base sequence may include a combination of a primary synchronization signal (PSS) and a secondary synchronization signal (SSS). For example, the segmentation and interleaving circuitry 702 may be configured to perform segmentation of a PSS sequence and an SSS sequence to produce a segmented PSS sequence ($d_{PSS}(n)$) and a segmented SSS sequence ($d_{SSS}(n)$). The segmentation and interleaving circuitry 702 may further perform interleaving or otherwise combining of the segmented PSS sequence ($d_{PSS}(n)$) and the segmented SSS sequence ($d_{SSS}(n)$) to form a base sequence ($D_{RSS}(n)$). For example, the segmentation and interleaving circuitry 702 may generate truncated versions of the PSS sequence and/or SSS sequence based on the bandwidth of the BWP associated with the base sequence. In NR 3GPP specifications, the sequence length of the PSS and SSS is 127. However, the length (n) of the PSS sequence and SSS sequence utilized in the generation of the RSS may be less than or equal to 127 based on the BWP configuration. In some examples, the segmentation and interleaving circuitry 702 may generate the base sequence from just one of the PSS or SSS. In this example, the PSS or SSS may be segmented and each segment may further be truncated.

The segmentation and interleaving circuitry 702 may then combine the truncated versions of the PSS sequence and/or SSS sequence to produce the base sequence. For example, the base sequence ($D_{RSS}(n)$) may be derived using segmentation and interleaving as follows:

$$D_{RSS}(2n)=d_{PSS}(\mathrm{mod}(n,127)) \text{ and } D_{RSS}(2n+1)=d_{SSS}(\mathrm{mod}(n,127)) \quad \text{(Equation 1)},$$

where n is a slot, $0<=n<N_{RSS}$, where $N_{RSS}$ is a length of the RSS sequence.

As another example, the base sequence ($D_{RSS}$ (n)) may be derived using segmentation and interleaving as follows:

$$D_{RSS}(2n)=d_{SSS}(\mod(n,127)) \text{ and } D_{RSS}(2n+1)=d_{PSS}(\mod(n,127)) \quad \text{(Equation 2)},$$

where n is a slot, $0<=n<N_{RSS}$, where $N_{RSS}$ is a length of the RSS sequence. The PSS sequence ($d_{PSS}$ (n)) and the SSS sequence ($d_{SSS}$ (n)) may be generated based on, for example, the 3GPP NR Rel.-15 Specification (Clauses 7.4.2.2 and 7.4.2.3, TS 38.211).

In some examples, the segmentation and interleaving circuitry 702 may combine the sequence parts by multiplexing the PSS sequence and the SSS sequence to form the base sequence ($D_{RSS}$ (n)). For example, the base sequence ($D_{RSS}$ (n)) may be derived using multiplexing as follows:

$$D_{RSS}(n)=d_{PSS}(\mod(n,127)) \text{ and } D_{RSS}(n+N_{RSS})=d_{SSS}(\mod(n,127)) \quad \text{(Equation 3)},$$

where n is a slot, $0<=n<N_{RSS}$, where $N_{RSS}$ is a length of the RSS sequence.

As another example, the base sequence ($D_{RSS}$ (n)) may be derived using multiplexing as follows:

$$D_{RSS}(2n)=d_{SSS}(\mod(n,127)) \text{ and } D_{RSS}(n+N_{RSS})=d_{PSS}(\mod(n,127)) \quad \text{(Equation 4)},$$

where n is a slot, $0<=n<N_{RSS}$, where $N_{RSS}$ is a length of the RSS sequence. The PSS sequence ($d_{PSS}$ (n)) and the SSS sequence ($d_{SSS}$ (n)) may be generated based on, for example, the 3GPP NR Rel.-15 Specification (Clauses 7.4.2.2 and 7.4.2.3, TS 38.211).

In some aspects, the interleaved or multiplexed PSS sequence ($d_{PSS}$ (n)) and SSS sequence ($d_{SSS}$ (n)) may be cyclic shifted to produce the base sequence. For example, the segmentation and interleaving circuitry 702 may further be configured to generate a cyclic shift derived as follows:

$$Q_{cs}=\alpha k \quad \text{(Equation 5)},$$

where $\alpha$ is a constant, k denotes the index of RSS beam, $0<=k_{max}$.

The PN sequence generator 704 may be configured to generate a scrambling sequence ($C_k$ (n)) for an RSS beam k that is used by the scrambling circuitry 706 to scramble the base sequence. For example, the PN sequence generator 704 may generate the scrambling sequence ($C_k$ (n)) for an RSS beam k based on an RSS beam index k and a cell identifier (ID) ($N^{cell}_{ID}$). The cell identifier may identify a cell associated with the base station 604. The scrambling sequence ($C_k$ (n)) may be a beam-dependent scrambling sequence and may have a bandwidth that is twice a bandwidth of the RSS. For example, the PN sequence generator 704 may form the scrambling sequence ($C_k$ (n)) using both the cell identifier and the RSS beam index k, where $0<=k<k_{max}$ and may be derived as follows:

$$C_{init}=[(2^{11})(\mod(k,8)+1)(((N^{cell}_{ID})/4)+1)]+[2^6)(\mod(k,8)+1)]+[\mod((N^{cell}_{ID}),4))] \quad \text{(Equation 6)},$$

where for a specific RSS beam (k), the scrambling sequence ($C_k$ (n)) is generated having a length that is twice a bandwidth of the RSS.

Figure 8:
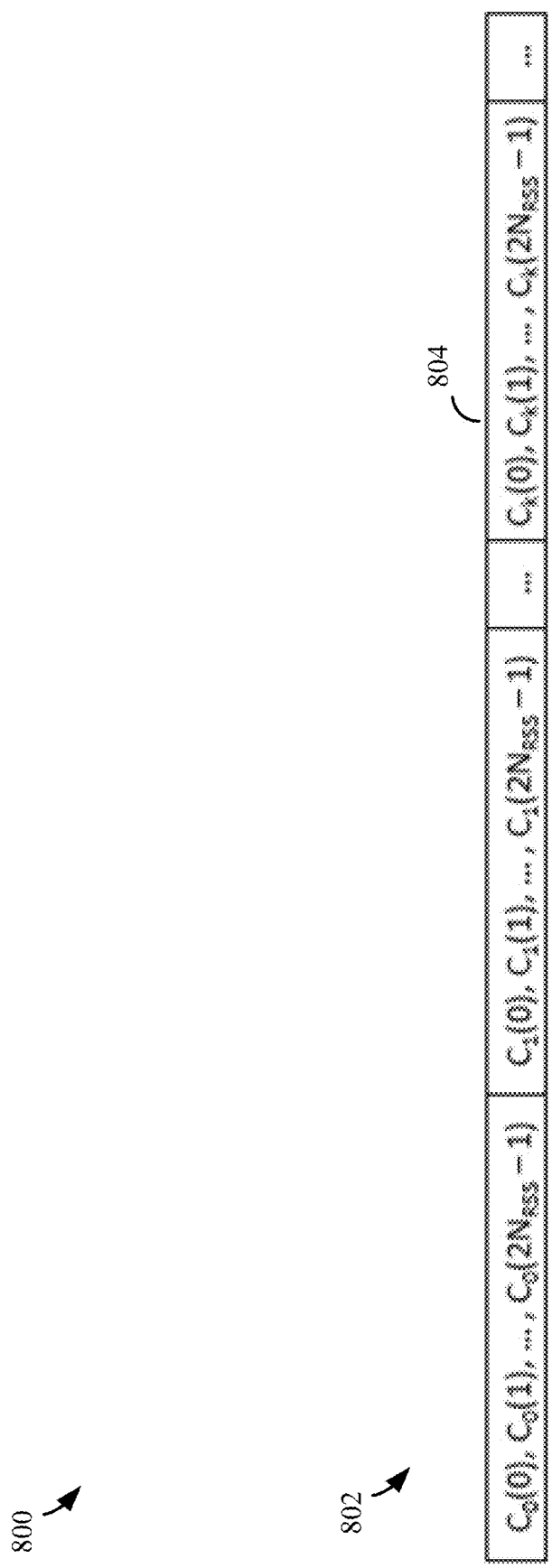
FIG. 8 illustrates an exemplary diagram of an extended scrambling sequence according to some aspects.

As another example, the PN sequence generator may form the scrambling sequence ($C_k$ (n)) using the cell identifier such that $C_{init}=N^{cell}_{ID}$ and generate an extended scrambling sequence of a length that is twice the product of the maximum beam number (kmax) and a length of the RSS sequence ($N_{RSS}$). The extended scrambling sequence may be uniformly partitioned into a plurality of segments ($k_{max}$ segments) such that each segment has an element that is twice an RSS bandwidth length $N_{RSS}$. FIG. 8, described further herein, illustrates an exemplary diagram of an extended scrambling sequence.

In other examples, the PN sequence generator 704 may be initialized with a panel identifier (ID) associated with multiple TRPs. For example, a UE may be in the coverage area of more than one cell. In this example, a respective base station (e.g., gNB) or remote radio head (RRH) of a base station serving one of the cells may function as a transmission and reception point (TRP) in a coordinated multi-point (CoMP) network configuration in which downlink and/or uplink signals may be transmitted between the UE and each of the multiple TRPs. Each TRP in the multi-TRP configuration may include a plurality of antenna arrays, each including one or more antenna panels for communication with the UE. The PN sequence generator 704 may be configured to generate the scrambling sequence using the panel ID of a panel utilized for transmission of the RSS.

The scrambling circuitry 706 may scramble the base sequence $D_{RSS}$ (n) with the beam-dependent scrambling sequence $C_k$ (n) to generate a scrambled sequence $S_k$ (n). The scrambling sequence $S_k$ (n) may be derived as follows:

$$S_k(n)=\mod((D_{RSS}(n)+C_k(n)),2) \quad \text{(Equation 7)},$$

where n is a slot, $0<=n<2N_{RSS}-1$, where $N_{RSS}$ is a length of the RSS sequence.

The quadrature phase shift keying (QPSK) modulator 708 may modulate the scrambled sequence $S_k$ (n) using quadrature phase shift keying (QPSK) to form a QPSK sequence corresponding to the RSS sequence and that has a bandwidth equal to the bandwidth of the RSS. For example, in-phase (I) and quadrature (Q) components of an RSS sequence for a $k^{th}$ beam corresponding to the elements of $S_k$ (n) with an even index and an odd index and may be derived as follows:

$$RSS_k(n)=(1/(2^{1/2}))(1-2(S_k(2n)))+j(1/(2^{1/2}))(1-2(S_k(2n+1))) \quad \text{(Equation 8)},$$

where n is a slot, $0<=n<N_{RSS}$, where $N_{RSS}$ is a length of the RSS sequence. In some examples, the in-phase component may include even indexed elements of the sequence and the quadrature-phase component may include odd indexed elements of the sequence.

In certain aspects, repetitions of the RSS may be generated on a same RSS beam of the one or more RSS beams in an RSS slot of a plurality of RSS slots. Each of the repetitions may be time-division multiplexed in the RSS slot. For example, the base station circuitry 700 may generate repetitions of the RSS for transmission in consecutive symbols of the RSS slot. In some examples, the code cover circuitry 710 may be configured to apply a binary cover code to each of the repetitions of the RSS and generate the RSS or a conjugate of the RSS for each of the repetitions of the RSS based on the binary code cover.

Figure 9:
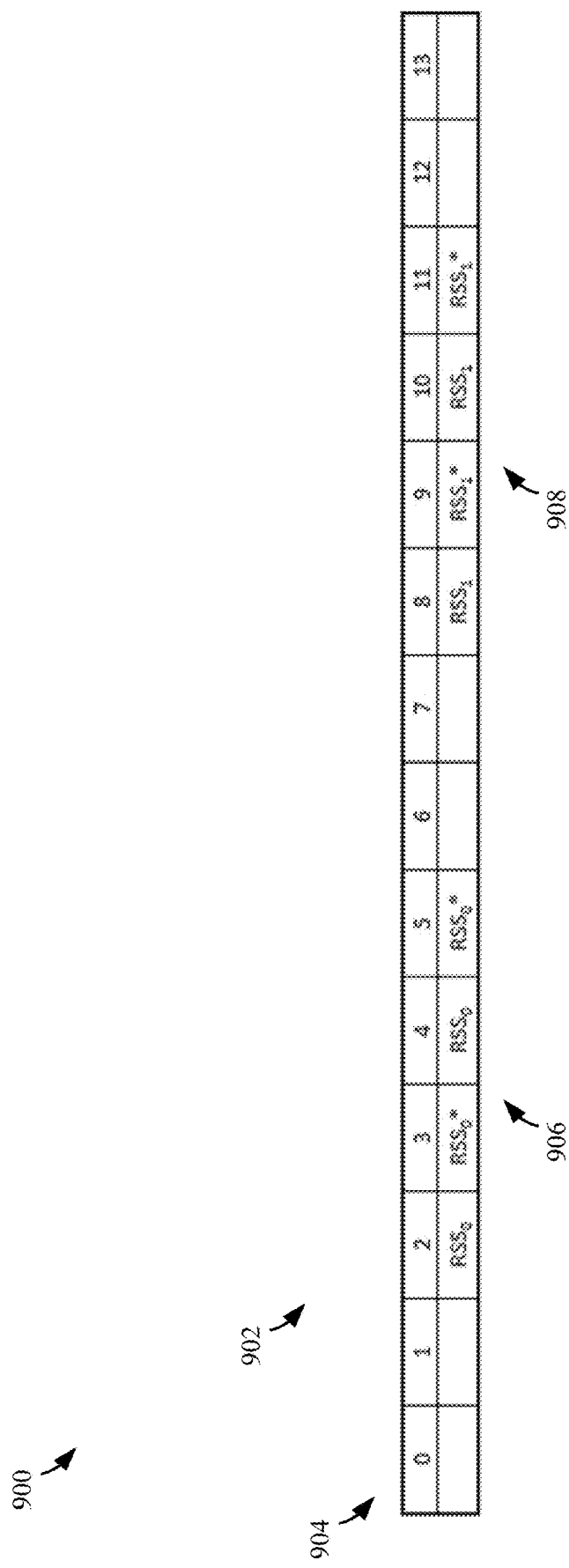
FIG. 9 illustrates an exemplary diagram of an OFDM symbol index according to some aspects.

For example, RSS beams may be time-division multiplexed and generated for transmission in pre-configured RSS slots. A same RSS beam (e.g., $RSS_k$) may be repeated a number (M) times within an RSS slot. When the same RSS beam is repeated at least twice (M>1), a binary cover code $C_M$ may be applied to the RSS repetitions for interference averaging. In some examples, the binary cover code $C_M$ may be a PN sequence and a function of a cell ID and a BWP ID. Based on a pattern of the binary cover code $C_M$, the RSS sequence or its conjugate may be generated for each of the RSS repetitions, which may then be transmitted across M OFDM symbols of the RSS slot. FIG. 9, described further herein, provides an exemplary diagram of an OFDM symbol index of one RSS slot.

The IFFT circuitry 712 may then be configured to apply an IFFT to the RSS or its conjugate to convert the RSS (or its conjugate) from the frequency domain to the time domain. The mapping circuitry 714 may be configured to map the RSS to one or more resource elements (REs) with an RSS slot. The RF circuitry 716 may then be configured to up-convert the RSS to a radio frequency (RF). The beamforming circuitry 718 may then be configured to generate one or more RSS beams for transmitting the RSS. For example, the beamforming circuitry 718 may include a phase-shifter for digital and/or analog beamforming via one or more antenna arrays.

In certain aspects, the base station circuitry 700 may generate one or more RSS beams, each for transmitting a respective RSS sequence. For example, the base station circuitry 700 may generate a first RSS sequence for transmission on the first RSS beam and a second RSS sequence for transmission on the second RSS beam. In some aspects, generating each of the first RSS sequence and the second RSS sequence may include generating a first base RSS sequence for the first RSS sequence and a second base RSS sequence for the second RSS sequence. Both the first and second base RSS sequences for the first and second RSS sequence may include a combination of a PSS and an SSS as may be generated by the segmentation and interleaving circuitry 702. For example, the segmentation and interleaving circuitry 702 may generate the first base RSS sequence for the first RSS sequence by interleaving or multiplexing the PSS with the SSS to produce the combination of the PSS and the SSS. As another example, the segmentation and interleaving circuitry 702 may generate the second base RSS sequence for the second RSS sequence by interleaving or multiplexing the PSS with the SSS to produce the combination of the PSS and the SSS. Here, the first and second base RSS sequences may be the same. As another example, the segmentation and interleaving circuitry 702 may generate the first base RSS sequence for the first RSS sequence by applying a first cyclic shift associated with the first RSS beam to the combination of the PSS and the SSS to produce the first base RSS sequence for the first RSS sequence and applying a second cyclic shift associated with the second RSS beam to the combination of the PSS and the SSS to produce the second base RSS sequence for the second RSS sequence. Here, the first and second base RSS sequences are different for the different RSS beams.

In some aspects, generating each of the first RSS sequence and the second RSS sequence may include scrambling the first base RSS sequence with a first beam-dependent scrambling sequence associated with the first RSS beam to form a first sequence and scrambling the second base RSS sequence with a second beam-dependent scrambling sequence associated with the second RSS beam to form a second sequence as may be performed by the scrambling circuitry 706.

In some aspects, generating each of the first RSS sequence and the second RSS sequence may include initializing the PN sequence generator 704 with a cell ID of a cell associated with a RAN node (e.g., a base station) and a first beam index of the first RSS beam to generate the first beam-dependent scrambling sequence having a sequence bandwidth that is twice the bandwidth of the RSS and initializing the PN sequence generator 704 with the cell ID and a second beam index of the second RSS beam to generate the second beam-dependent scrambling sequence having the sequence bandwidth that is twice the bandwidth of the RSS. Alternatively, generating each of the first RSS sequence and the second RSS sequence may include initializing the PN sequence generator 704 with a cell ID of a cell associated with the RAN node to generate an extended scrambling sequence including the first beam-dependent scrambling sequence and the second beam-dependent scrambling sequence, each having a sequence bandwidth that is twice the first bandwidth of the RSS. In some examples, the extended scrambling sequence may include a plurality of segments with each segment being associated with a respective RSS beam of a plurality of RSS beams including a first beam and a second beam.

In some aspects, the scrambled first sequence and the scrambled second sequence may each have a sequence bandwidth that is twice the bandwidth of the RSS. Thus, generating the first RSS sequence and the second RSS sequence may include modulating the first sequence using QPSK to form a first QPSK sequence corresponding to the first RSS sequence and including the bandwidth of the RSS and modulating the second sequence using QPSK to form a second QPSK sequence corresponding to the second RSS sequence and including the bandwidth of the RSS as may be performed by the QPSK modulator 708. In some aspects, the first QPSK sequence may include first in-phase components and first quadrature-phase components. The first in-phase components may include even indexed elements of the first sequence and the first quadrature-phase components may include odd indexed elements of the first sequence. Similarly, the second QPSK sequence may include second in-phase components and second quadrature-phase components. The second in-phase components may include even indexed elements of the second sequence and the second quadrature-phase components may include odd indexed elements of the second sequence.

In certain aspects, the base station circuitry 700 may beamform and quasi co-locate each of the one or more RSS beams with a respective SSB beam or CSI-RS beam. Different RSS sequences may be transmitted on different RSS beams. As described herein, an RSS sequence associated with the k-th RSS beam may be denoted by $RSS_k$, where $0<=k<k_{max}$. The $RSS_k$ may be a QPSK sequence of length $N_{RSS}$ and may be mapped to $N_{RSS}$ consecutive resource elements (REs), for example, in a center RB of an active BWP such that $N_{RSS}(n)$, $n=0, 1, \ldots, (N_{RSS}-1)$, $0<=k<k_{max}$. The in-phase (I) and quadrature (Q) components of $RSS_k$ may be scrambled by a binary scrambling sequence $C_k(n)$, as described herein, parameterized on a beam index k, where $0<=k<k_{max}$. The I component may include even indexed elements of the sequence and the Q component may include odd indexed elements of the sequence. In some aspects, $k_{max}$ may denote a maximum number of RSS beams which may be equivalent to a maximum number of SSB beams at a given carrier frequency range. For example, when $k_{max}=4$, the carrier frequency range may span as high as about 3 GHz. As another example, when $k_{max}=8$, the carrier frequency range may span as low as about 3 GHz and as high as about 6 GHz. As yet another example, when $k_{max}=64$, the carrier frequency range may span as low as about 6 GHz and as high as about 52.6 GHz.

Figure 7B:
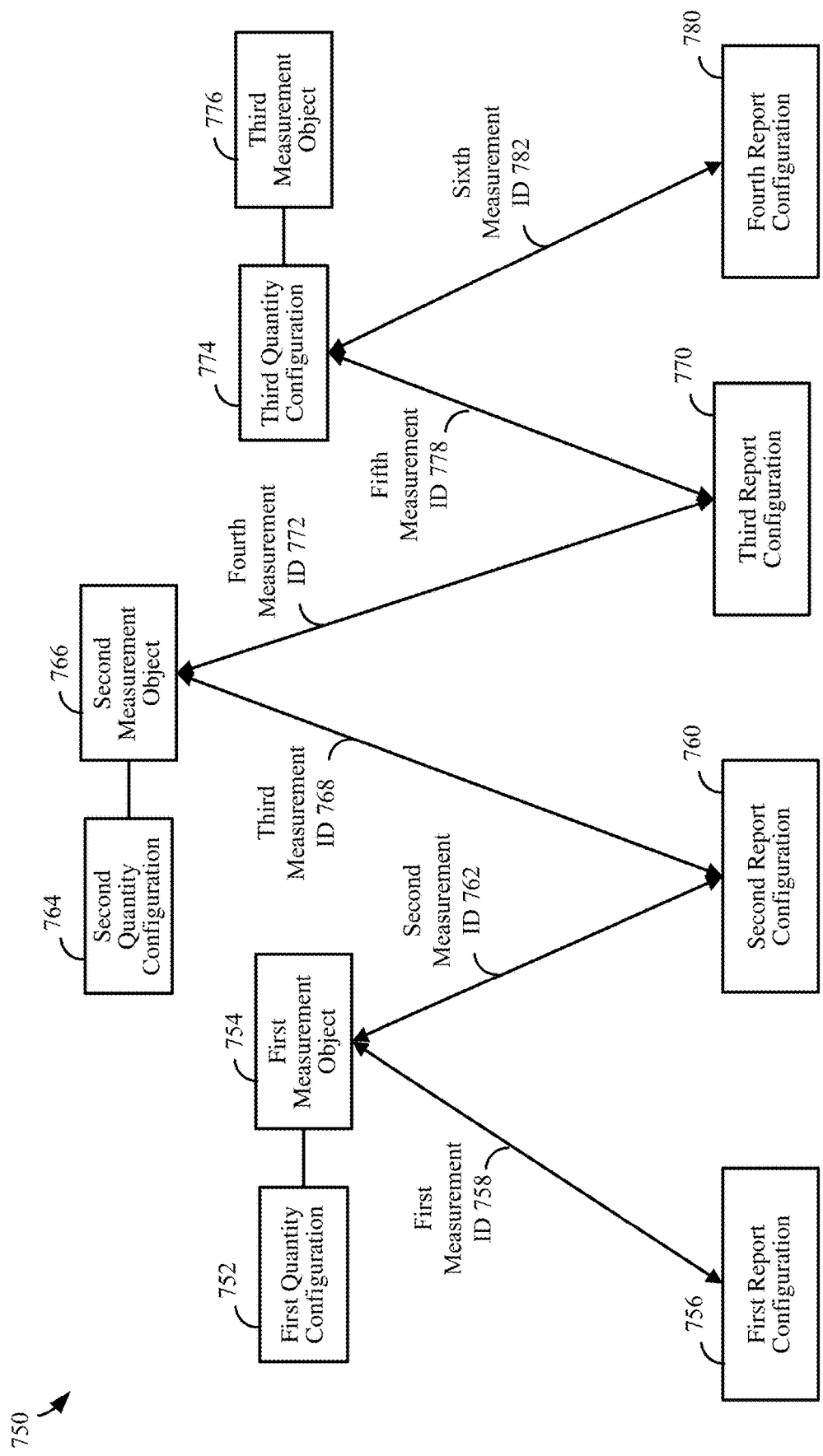
FIG. 7B is a diagram illustrating example relationships between RSS measurements according to some aspects.

FIG. 7B is a diagram illustrating example relationships 750 between RSS measurements according to some aspects. As shown in FIG. 7B, an RSS may include a first quantity configuration 752 and a first measurement object 754. The first quantity configuration 752 and the first measurement object 754 may be linked to a first report configuration 756 via a first measurement ID 758. In some aspects, the first quantity configuration 752 and the first measurement object 754 may be, additionally or alternatively, linked to a second report configuration 760 via a second measurement ID 762. In some aspects, another RSS may include a second quantity configuration 764 and a second measurement object 766.

The second quantity configuration 764 and the second measurement object 766 may be linked to the second report configuration 760 via a third measurement ID 768. In some aspects, the second quantity configuration 764 and the second measurement object 766 may be, additionally or alternatively, linked to a third report configuration 770 via a fourth measurement ID 772. In some aspects, yet another RSS may include a third quantity configuration 774 and a third measurement object 776. The third quantity configuration 774 and the third measurement object 776 may be linked to the third report configuration 770 via a fifth measurement ID 778. In some aspects, the third quantity configuration 774 and the third measurement object 776 may be, additionally or alternatively, linked to a fourth report configuration 780 via a sixth measurement ID 782.

FIG. 8 illustrates an exemplary diagram of an extended scrambling sequence 800 according to some aspects. As shown in FIG. 8, the extended scrambling sequence 800 may include a plurality of uniformly partitioned segments 802. Each of the plurality of uniformly partitioned segments 802 may be associated with a single RSS beam of a plurality of RSS beams. A kth segment 804 of the plurality of uniformly partitioned segments 802 may be used for the scrambling sequence ($C_k$ (n)).

FIG. 9 illustrates an exemplary diagram of an OFDM symbol index 900 according to some aspects. The OFDM symbol index 900 represents a single RSS slot 902 including a plurality of symbols 904. When M=4 and the binary cover code ($C_M$)=[0 1 0 1], an RSS sequence ($RSS_k$) and its conjugate ($RSS_k^*$) may be generated for transmission on an RSS beam (e.g., RSS beam k) and repeated across four OFDM symbols in accordance with the binary cover code, $C_M$. As shown in FIG. 9, the OFDM symbol index 900 includes a repeated RSS sequence and its conjugate for a first beam 906 and a repeated RSS sequence and its conjugate for a second beam 908. The RSS sequence and its conjugate for the first beam 906 may be beamformed and repeated across four OFDM symbols: 2, 3, 4, and 5 according to the binary cover code, $C_M$, [0 1 0 1], where the "0" indicates RSS sequence and the "1" indicates the conjugate RSS sequence. The RSS sequence and its conjugate for the second beam 908 may be beamformed and repeated across four OFDM symbols: 8, 9, 10, and 11 according to the binary cover code, $C_M$, [0 1 0 1], where the "0" indicates RSS sequence and the "1" indicates the conjugate RSS sequence.

FIG. 10 illustrates an exemplary diagram 1000 of an RSS according to some aspects. As shown in FIG. 10, an RSS 1002 may be positioned in one or more RBs 1004 of an active bandwidth part (BWP) 1006. The bandwidth (e.g., number of RBs) of the RSS may be greater than or equal to a ceiling or maximum length ($N_{RSS}$) of the RSS divided by 12. In some aspects, the RSS 1002 may be aligned with a center RB of the active BWP 1006. Additionally, a first guard band 1008 and a second guard band 1010 may be positioned adjacent the RSS 1002 in the RB 1004 so that the RSS 1002, the first guard band 1008, and the second guard band 1010 occupy the entire bandwidth of the active BWP 1006.

Figure 11:
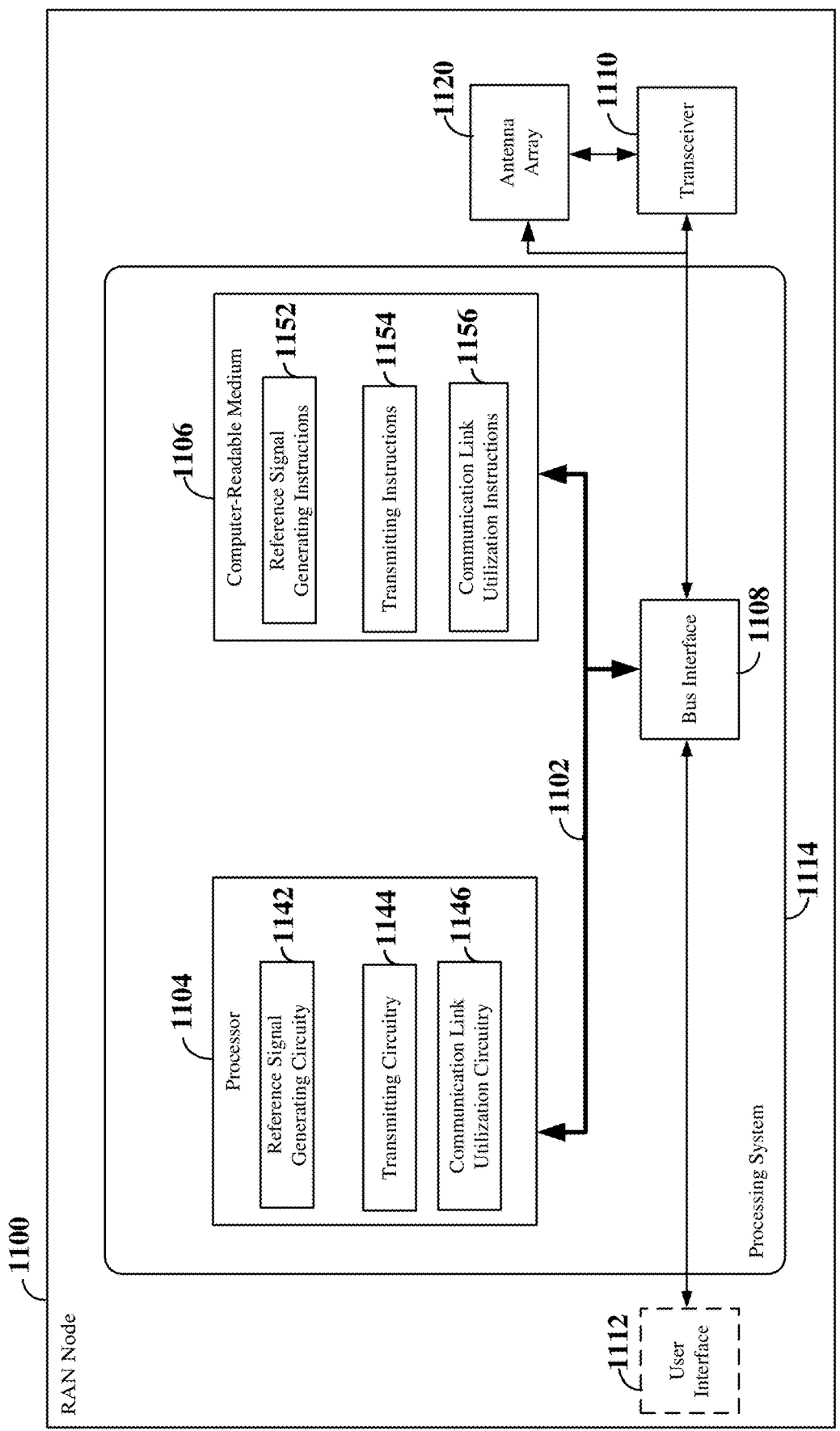
FIG. 11 is a conceptual diagram illustrating an example of a hardware implementation for an exemplary RAN node employing a processing system according to some aspects.

FIG. 11 is a conceptual diagram illustrating an example of a hardware implementation for an exemplary RAN node 1100 employing a processing system 1114 according to some aspects. For example, the RAN node 1100 may be any of the base stations (e.g., gNB or eNB) illustrated in any one or more of FIGS. 1-6.

The RAN node 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1100 may be configured to perform any one or more of the functions described herein. That is, the processor 1104, as utilized in a RAN node 1100, may be used to implement any one or more of the processes described herein. The processor 1104 may in some instances be implemented via a baseband or modem chip and in other implementations, the processor 1104 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), and computer-readable media (represented generally by the computer-readable storage medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium (e.g., air interface). A user interface 1112 (e.g., keypad, display, speaker, microphone, joystick) may also be provided.

The processor 1104 is responsible for managing the bus 1102 and general processing, including the execution of software stored on the computer-readable storage medium 1106. The software, when executed by the processor 1104, causes the processing system 1114 to perform the various functions described herein for any particular apparatus. The computer-readable storage medium 1106 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1106.

The computer-readable storage medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1106 may reside in the processing system 1114, external to the processing system 1114, or distributed across multiple entities including the processing system 1114. The computer-readable storage medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects, the processor 1104 may include circuitry configured for various functions. For example, the processor 1104 may include reference signal generating circuitry 1142 configured to generate one or more reference signal as described herein and including an RSS for an active BWP of a plurality of BWPs. The reference signal generating circuitry 1142 may further be configured to execute reference signal generating instructions 1152 stored in the computer-readable storage medium 1106 to implement any of the one or more of the functions described herein.

The processor 1104 may also include transmitting circuitry 1144 configured to transmit, via the transceiver 1110, the RSS in the active BWP, where a bandwidth of the RSS is based on a bandwidth of the active BWP. In some aspects, the transmitting circuitry 1144 may be configured to transmit, via the transceiver 1110, at least one of a SIB message or an RRC message identifying a power offset of the RSS with respect to an SSB reference signal. Subsequently, the transmitting circuitry 1144 may be configured to transmit, via the transceiver 1110, the RSS in the active BWP and with an increased power relative to a power of the SSB reference signal based on the power offset, where the bandwidth of the RSS is based on a bandwidth of the active BWP. In addition, the transmitting circuitry 1144 may further be configured to transmit, via the transceiver 1110, additional messages that may be received by one or more UEs. The transmitting circuitry 1144 may further be configured to execute transmitting instructions 1154 stored in the computer-readable storage medium 1106 to implement any of the one or more of the functions described herein.

The processor 1104 may further include communication link utilization circuitry 1146 configured to utilize a communication link with the UE based on the RSS. The communication link utilization circuitry 1146 may further be configured to execute communication link utilization instructions 1156 stored in the computer-readable storage medium 1106 to implement any of the one or more of the functions described herein.

Figure 12:
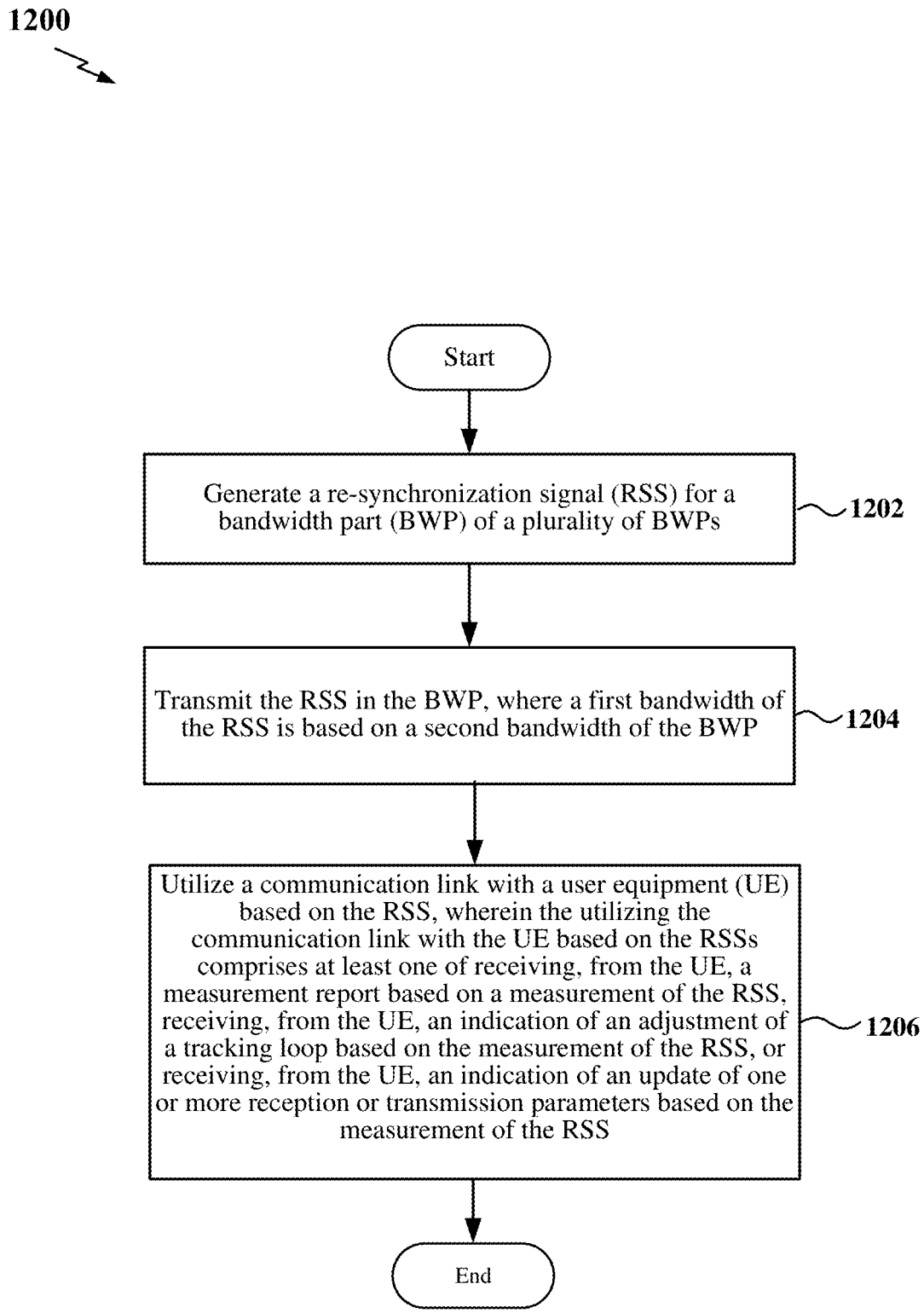
FIG. 12 is a flow chart of a method of generating and utilizing an RSS in a wireless communication system according to some aspects.

FIG. 12 is a flow chart 1200 of a method of generating and utilizing an RSS in a wireless communication system according to some aspects. As described below, some or all illustrated features may be omitted in a particular implementation within the scope of the present disclosure, and some illustrated features may not be required for implementation of all aspects. In some examples, the method may be performed by the RAN node 1100, as described above and illustrated in FIG. 11, by a processor or processing system, or by any suitable means for carrying out the described functions.

At block 1202, the RAN node 1100 may generate an RSS for a BWP of a plurality of BWPs. In some aspects, the active BWP excludes an SSB. The bandwidth of the RSS may be based on a bandwidth of the active BWP. In certain aspects, a bandwidth of the RSS may be scalable to a bandwidth of the active BWP. For example, a first active BWP may have a bandwidth that is larger than a bandwidth of a second active BWP. An RSS generated for transmission in the first active BWP may be larger than an RSS generated for transmission in the second active BWP. Conversely, an RSS generated for transmission in the second active BWP may be smaller than an RSS generated for transmission in the first active BWP. In certain aspects, a bandwidth of the RSS may be scalable in proportion to a bandwidth of the active BWP. For example, a first active BWP may have a bandwidth that is twice as large as a bandwidth of a second active BWP. An RSS generated for transmission in the first active BWP may be twice as large as an RSS generated for transmission in the second active BWP. Conversely, an RSS generated for transmission in the second active BWP may be twice as small as an RSS generated for transmission in the first active BWP. The generation of the RSS for the active BWP of the plurality of BWP may be further described with respect to the description of FIGS. 6, 7A, 7B, 8, and 9 provided herein. The reference signal generating circuitry 1142 shown and described above in connection with FIG. 11, may generate the RSS for the active BWP of the plurality of BWPs on the RAN node. In some aspects, the RAN node 1100 may generate a measurement object and a measurement report configuration for the RSS.

At block 1204, the RAN node 1100 may transmit the RSS in the BWP of a downlink (DL) and the bandwidth of the RSS is based on a bandwidth of the BWP. For example, the RAN node 1100 may transmit the RSS in the active BWP of the plurality of BWPs and a UE may receive the RSS in the active BWP of the plurality of BWPs. In some aspects, a time duration of the RSS is based on an active time of the active downlink BWP. In certain aspects, the RSS may be transmitted in a single symbol or multiple symbols of the active BWP. In some aspects, the RSS may be transmitted in a group of consecutive RBs aligned with a pre-configured frequency raster associated with the active BWP or in a set of consecutive resource block (RB) in the active BWP. In some aspects, the RSS may be transmitted on a set of symbols within a set of slots configured by the RAN node 1100. The bandwidth of the RSS may be greater than or equal to a ceiling or maximum length ($N_{RSS}$) of an RB divided by 12. In some aspects, a first guard band and a second guard band may be positioned adjacent the RSS in the RB so that the RSS in the RB, the first guard band, and the second guard band occupy the entire bandwidth of the active BWP.

As described herein, the RAN node 1100 may transmit the RSS on one or more RSS beams such as a first RSS beam and a second RSS beam. The RAN node 1100 may transmit each of the one or more RSS beams by quasi-locating each of the one or more RSS beams with a synchronization signal block (SSB) beam. The RAN node 1100 may transmit each of the one or more RSS beams in a channel state information reference signal (CSI-RS) beam. The RAN node 1100 may transmit repetitions of the RSS on a same RSS beam of the one or more RSS beams in an RSS slot of a plurality of RSS slots. Each of the repetitions may be time-division multiplexed in the RSS slot. In some aspects, the repetitions of the RSS may be transmitted in consecutive symbols of the RSS slot. The RAN node 1100 may transmit the RSS in at least one RSS slot of a plurality of slots. The at least one RSS slot may be pre-configured for the active BWP. In some aspects, the RAN node 1100 may transmit the measurement object and the measurement report configuration of the RSS to a UE.

In certain aspects, the RAN node 1100 may beamform and quasi co-locate each of the one or more RSS beams with a respective synchronization signal block (SSB) beam. Different RSS sequences may be transmitted on different RSS beams. As described herein, an RSS sequence associated with the k-th RSS beam may be denoted by $RSS_k$, where $0<=k<k_{max}$. The $RSS_k$ may be a QPSK sequence of length $N_{RSS}$ and may be mapped to $N_{RSS}$ consecutive resource elements (REs), for example, in a center RB of an active BWP such that $N_{RSS}(n)$, $n=0, 1, \ldots, (N_{RSS}-1)$, $0<=k<k_{max}$. The in-phase (I) and quadrature (Q) components of $RSS_k$ may be scrambled by a binary scrambling sequence $C_k(n)$, as described herein, parameterized on a beam index k, where $0<=k<k_{max}$. The I component may include even indexed elements of the sequence and the Q component may include odd indexed elements of the sequence. In some aspects, $k_{max}$ may denote a maximum number of RSS beams which may be equivalent to a maximum number of SSB beams at a given carrier frequency range. For example, when $k_{max}=4$, the carrier frequency range may span as high as about 3 GHz. As another example, when $k_{max}=8$, the carrier frequency range may span as low as about 3 GHz and as high as about 6 GHz. As yet another example, when $k_{max}=64$, the carrier frequency range may span as low as about 6 GHz and as high as about 52.6 GHz.

In some aspects, the RAN node 1100 may transmit at least one of a system information block (SIB) message or a radio resource control (RRC) message identifying the at least one RSS slot for the active BWP. For example, the RAN node 1100 may transmit an RSS in at least one RSS slot of a plurality of slots. Before transmitting the RSS, the RAN node 1100 may transmit at least one of an SIB message or an RRC message so that a UE may identify the at least one RSS slot for the active BWP. The transmitting circuitry 1144, together with the transceiver 1110, shown and described above in connection with FIG. 11 may transmit the RSS.

At block 1206, the RAN node 1100 may utilize a communication link with the UE based on the RSS measurement. The utilizing the communication link with the UE based on the RSSs may include at least one of receiving, from the UE, a measurement report based on a measurement of the RSS, receiving, from the UE, an indication of an adjustment of a tracking loop based on the measurement of the RSS, or receiving, from the UE, an indication of an update of one or more reception or transmission parameters based on the measurement of the RSS. In some examples, utilizing a communication link with the UE based on the measurement may include receiving a measurement report (e.g., CSI report) transmitted by the UE and utilizing the measurement report to adapt transmissions to current channel conditions. In some examples, utilizing a communication link with the UE based on the measurement may include adjusting tracking loops of the UE based on the measurement. In some examples, utilizing a communication link with the UE based on the measurement may include updating one or more receiving or transmitting parameters of the UE.

The communication link utilization circuitry 1146, together with the transceiver 1110, shown and described above in connection with FIG. 11 may utilize a communication link between the RAN node 1100 and a UE.

Figure 13:
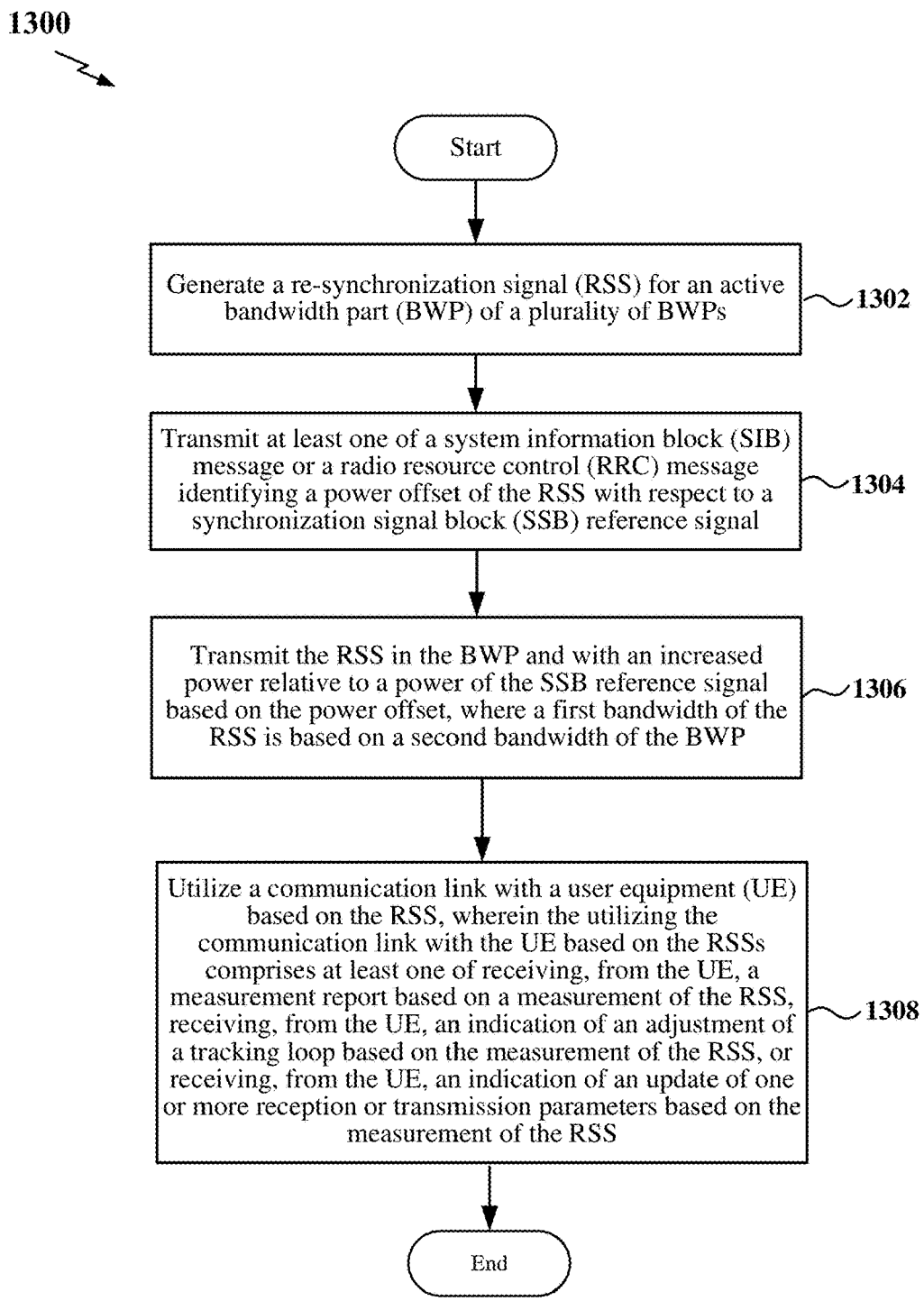
FIG. 13 is a flow chart of a method of generating and utilizing an RSS in a wireless communication system according to some aspects.

FIG. 13 is a flow chart 1300 of a method of generating and utilizing an RSS in a wireless communication system according to some aspects. As described below, some or all illustrated features may be omitted in a particular implementation within the scope of the present disclosure, and some illustrated features may not be required for implementation of all aspects. In some examples, the method may be performed by the RAN node 1100, as described above and illustrated in FIG. 11, by a processor or processing system, or by any suitable means for carrying out the described functions.

At block 1302, the RAN node 1100 may generate an RSS for an active BWP of a plurality of BWPs. The features described herein with respect to block 1302 may include one or more of the same or similar features described herein with respect to block 1202 of flow chart 1200 illustrated in FIG. 12.

At block 1304, the RAN node 1100 may transmit at least one of an SIB message or an RRC message identifying a power offset of the RSS with respect to a synchronization signal block (SSB) reference signal. For example, before the RAN node 1100 transmits the RSS in the active BWP of the plurality of BWPs, the RAN node 1100 may transmit at least one of a system information block (SIB) message or a radio resource control (RRC) message identifying a power offset of the RSS with respect to a synchronization signal block (SSB) reference signal. The RAN node 1100 may subsequently transmit the RSS in the active BWP of the plurality of BWPs and with an increased power relative to a power of the SSB reference signal based on the power offset. The transmitting circuitry 1144, together with the transceiver 1110, shown and described above in connection with FIG. 11 may transmit at least one of an SIB message or an RRC message identifying a power offset of the RSS with respect to a synchronization signal block (SSB) reference signal. In some aspects, the power offset may indicated in SI or by dedicated RRC signaling.

At block 1306, the RAN node 1100 may transmit the RSS in the active BWP and with an increased power relative to a power of the SSB reference signal based on the power offset, where a first bandwidth of the RSS is based on a second bandwidth of the active BWP. In addition, the features described herein with respect to block 1306 may include one or more of the same or similar features described herein with respect to block 1204 of flow chart 1200 illustrated in FIG. 12. The transmitting circuitry 1144, together with the transceiver 1110, shown and described above in connection with FIG. 11 may transmit the RSS.

At block 1308, the RAN node 1100 may utilize a communication link with a UE based on the RSS. The features described herein with respect to block 1308 may include one or more of the same or similar features described herein with respect to block 1206 of flow chart 1200 illustrated in FIG. 12.

In one configuration, the RAN node 1100 may include means for performing the various functions and processes described in relation to FIGS. 1-6, 12, 13, 15, and/or 16. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-6, 12, 13, 15, and/or 16.

Figure 14:
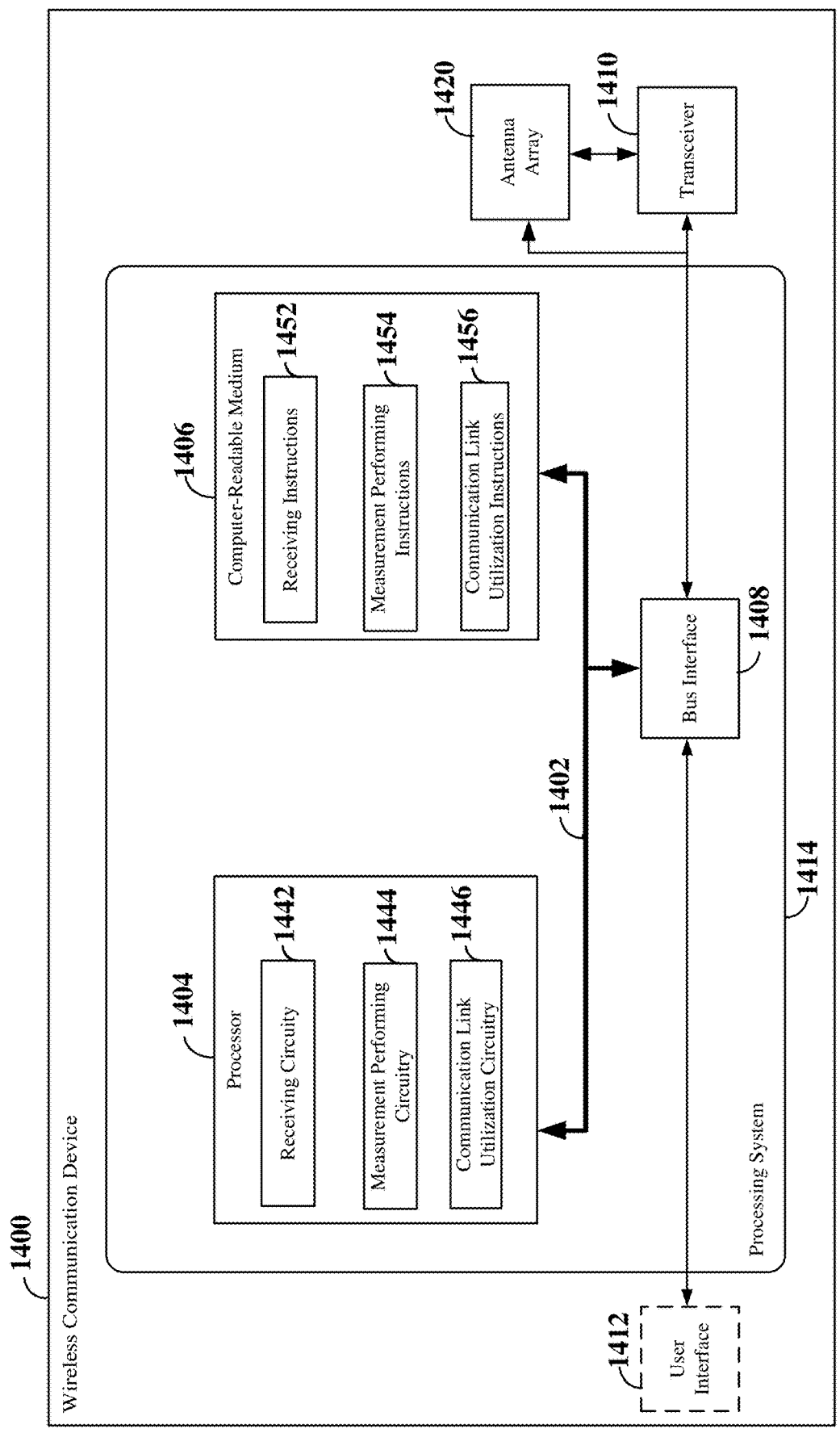
FIG. 14 is a block diagram illustrating an example of a hardware implementation for a wireless communication device employing a processing system according to some aspects.

FIG. 14 is a block diagram illustrating an example of a hardware implementation for a wireless communication device 1400 employing a processing system 1414 according to some aspects. For example, the wireless communication device 1800 may correspond to any of the UEs shown and described above in any one or more of FIGS. 1-6, 15, and/or 16.

In accordance with various aspects, an element, or any portion of an element, or any combination of elements may be implemented with a processing system 1414 that includes one or more processors 1404. The processing system 1414 may be substantially the same as the processing system 1114 illustrated in FIG. 11, including a bus interface 1408, a bus 1402, a processor 1404, and a computer-readable storage medium 1406. Furthermore, the wireless communication device 1400 may include a user interface 1412 and a transceiver 1410 substantially similar to those described above in FIG. 11. That is, the processor 1404, as utilized in a wireless communication device 1400, may be used to implement any one or more of the processes described herein.

In some aspects, the processor 1404 may include circuitry configured for various functions. For example, the processor 1404 may include receiving circuitry 1442 configured to receive, from a RAN node (e.g., base station, such as a gNB or eNB) and via the transceiver 1410, an RSS for an active BWP of a plurality of BWPS. The bandwidth of the RSS may be based on a bandwidth of the active BWP.

The receiving circuitry 1442 may include one or more hardware components that provide the physical structure that performs processes related to wireless communication (e.g., signal reception and/or signal transmission) and signal processing (e.g., processing a received signal and/or processing a signal for transmission). For example, the receiving circuitry 1442 may be configured to receive information and data with the base station via one or more subframes and/or slots. In addition, the receiving circuitry 1442 may further be configured to receive, via the transceiver 1810, additional messages from the base station.

In some aspects, the receiving circuitry 1442 may be configured to receive, via the transceiver 1410, at least one of an SIB message or an RRC message identifying a power offset of the RSS with respect to an SSB reference signal. Subsequently, the receiving circuitry 1442 may be configured to transmit, via the transceiver 1410, the RSS in the active BWP and with an increased power relative to a power of the SSB reference signal based on the power offset, where the bandwidth of the RSS is based on a bandwidth of the active BWP. In addition, the receiving circuitry 1442 may further be configured to receive, via the transceiver 1410, additional messages that may be transmitted by one or more RAN nodes. The receiving circuitry 1442 may further be configured to execute receiving software 1452 stored on the computer-readable storage medium 1406 to implement one or more functions described herein.

The processor 1404 may also include measurement performing circuitry 1444 configured to perform measurement of one or more reference signals including an RSS received by the receiving circuitry 1442. For example, the wireless communication device 1400 may receive the RSS in an active BWP of the plurality of BWPs and, after receiving the RSS, perform a measurement of the RSS. The measurement performing circuitry 1444 may further be configured to execute measurement performing instructions 1454 stored on the computer-readable storage medium 1406 to implement one or more functions described herein.

The processor 1404 may further include communication link utilization circuitry 1446 configured to utilize a communication link between the wireless communication device 1400 and a RAN node based on the RSS measurement.

The communication link utilization circuitry 1446 may further be configured to execute communication link utilization software 1456 stored on the computer-readable storage medium 1406 to implement one or more functions described herein.

Figure 15:
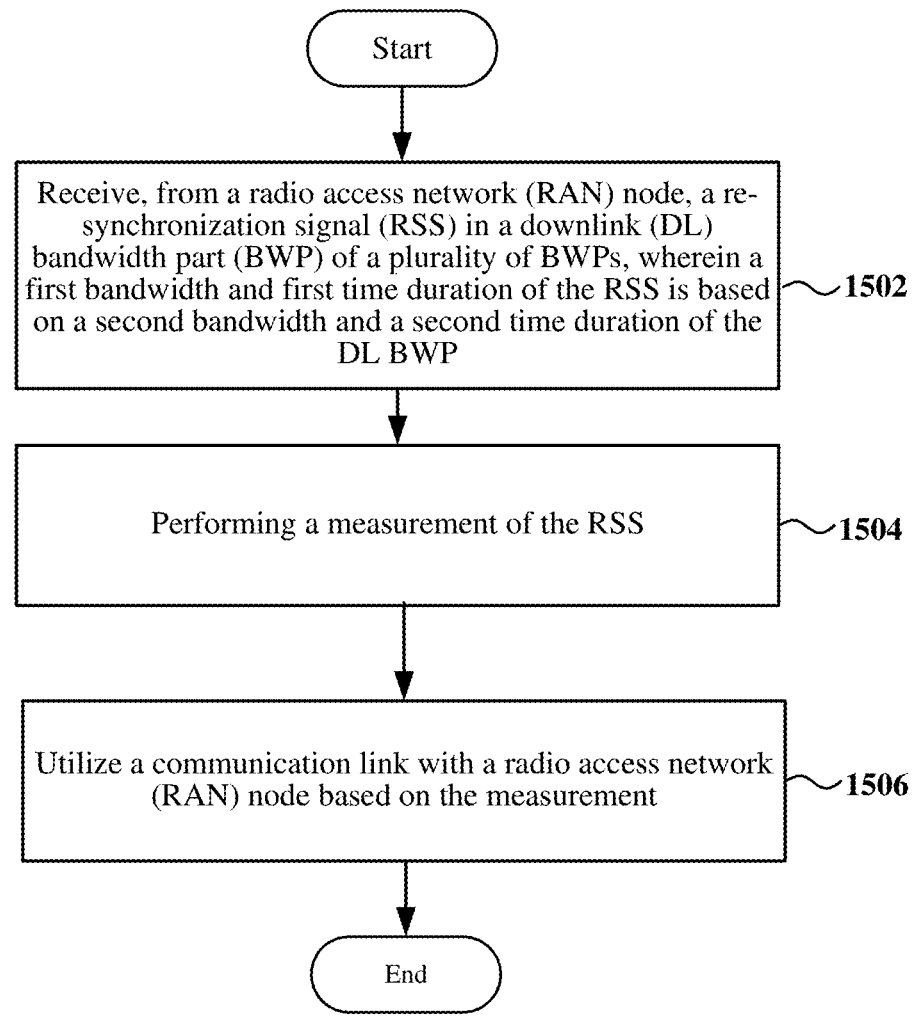
FIG. 15 is a flow chart of a method of receiving and utilizing an RSS in a wireless communication system according to some aspects.

FIG. 15 is a flow chart 1500 of a method of receiving and utilizing an RSS in a wireless communication system according to some aspects. As described below, some or all illustrated features may be omitted in a particular implementation within the scope of the present disclosure, and some illustrated features may not be required for implementation of all aspects. In some examples, the method may be performed by the wireless communication device 1400, as described above and illustrated in FIG. 14, by a processor or processing system, or by any suitable means for carrying out the described functions.

At block 1502, the wireless communication device 1400 may receive, from a radio access network (RAN) node, a re-synchronization signal (RSS) in a downlink (DL) bandwidth part (BWP) of a plurality of BWPs. In some aspects, a first bandwidth and first time duration of the RSS may be based on a second bandwidth and a second time duration of the DL BWP. The bandwidth of the RSS may be based on a bandwidth of the active BWP. In certain aspects, a bandwidth of the RSS may be scalable to a bandwidth of the active BWP. For example, a first active BWP may have a bandwidth that is larger than a bandwidth of a second active BWP. An RSS received in the first active BWP may be larger than an RSS received in the second active BWP. Conversely, an RSS received in the second active BWP may be smaller than an RSS received in the first active BWP. In certain aspects, a bandwidth of the RSS may be scalable in proportion to a bandwidth of the active BWP. For example, a first active BWP may have a bandwidth that is twice as large as a bandwidth of a second active BWP. An RSS received in the first active BWP may be twice as large as an RSS received in the second active BWP. Conversely, an RSS received in the second active BWP may be twice as small as an RSS received in the first active BWP. The received RSS for the active BWP of the plurality of BWP may be further described with respect to the description of FIGS. 6, 7A, 7B, 8, and 9 provided herein. The receiving circuitry 1442 shown and described above in connection with FIG. 14, may receive the RSS for the active BWP of the plurality of BWPs generated on the RAN node.

In certain aspects, the wireless communication device 1400 may receive the RSS in a single symbol or multiple symbols of the active BWP. In some aspects, the RSS may be received in a group of consecutive RBs aligned with a pre-configured frequency raster associated with the active BWP or in a set of consecutive resource block (RB) of the active BWP. The bandwidth of the RSS may be greater than or equal to a ceiling or maximum length ($N_{RSS}$) of a RB divided by 12. In some aspects, a first guard band and a second guard band may be positioned adjacent the RSS in the RB so that the RSS in the RB, the first guard band, and the second guard band occupy the entire bandwidth of the active BWP.

As described herein, the wireless communication device 1400 may receive the RSS on one or more RSS beams such as a first RSS beam and a second RSS beam. The wireless communication device 1400 may receive each of the one or more RSS beams, via quasi-location, of each of the one or more RSS beams with a synchronization signal block (SSB) beam or CSI-RS beam. The wireless communication device 1400 may receive repetitions of the RSS on a same RSS beam of the one or more RSS beams in an RSS slot of a plurality of RSS slots. Each of the repetitions may be time-division multiplexed in the RSS slot. In some aspects, the repetitions of the RSS may be transmitted in consecutive symbols of the RSS slot. The wireless communication device 1400 may receive the RSS in at least one RSS slot of a plurality of slots. The at least one RSS slot may be pre-configured for the active BWP.

In certain aspects, the wireless communication device 1400 may receive a beamformed and quasi co-located RSS in each of the one or more RSS beams with a respective synchronization signal block (SSB) beam. Different RSS sequences may be transmitted on different RSS beams. As described herein, an RSS sequence associated with the k-th RSS beam may be denoted by $RSS_k$, where $0<=k<k_{max}$. The $RSS_k$ may be a QPSK sequence of length $N_{RSS}$ and may be mapped to $N_{RSS}$ consecutive resource elements (REs), for example, in a center RB of an active BWP such that $N_{RSS}$ (n), n=0, 1, . . . , ($N_{RSS}$–1), $0<=k<k_{max}$. The in-phase (I) and quadrature (Q) components of $RSS_k$ may be scrambled by a binary scrambling sequence $C_k(n)$, as described herein, parameterized on a beam index k, where $0<=k<k_{max}$. The I component may include even indexed elements of the sequence and the Q component may include odd indexed elements of the sequence. In some aspects, $k_{max}$ may denote a maximum number of RSS beams which may be equivalent to a maximum number of SSB beams at a given carrier frequency range. For example, when $k_{max}$=4, the carrier frequency range may span as high as about 3 GHz. As another example, when $k_{max}$=8, the carrier frequency range may span as low as about 3 GHz and as high as about 6 GHz. As yet another example, when $k_{max}$=64, the carrier frequency range may span as low as about 6 GHz and as high as about 52.6 GHz. In some aspects, the RSS beams may be transmitted periodically or semi-statically, and the periodicities may be pre-configured by the RAN node or other network entity and indicated in system information (SI) or dedicated RRC signaling.

In some aspects, the wireless communication device 1400 may receive at least one of a system information block (SIB) message or a radio resource control (RRC) message identifying the at least one RSS slot for the active BWP. For example, the wireless communication device 1400 may receive an RSS in at least one RSS slot of a plurality of slots. Before receiving the RSS, the wireless communication device 1400 may receive at least one of an SIB message or an RRC message so that the wireless communication device 1400 may identify the at least one RSS slot for the active BWP. The receiving circuitry 1442, together with the transceiver 1410, shown and described herein in connection with FIG. 14 may receive the RSS.

At block 1504, the wireless communication device 1400 may perform a measurement of the RSS. For example, the wireless communication device 1400 may have received the RSS in an active BWP of the plurality of BWPs. Subsequently, the wireless communication device 1400 may perform a measurement of the RSS on an RSS beam. In some aspects, after performing the measurement of the RSS, the UE 602 may utilize the measurement of the RSS for radio resource management (RRM) or radio link monitoring (RLM) in different radio resource control (RRC) state of the UE 602 based on a measurement object (e.g., configuration information) and a measurement report configuration. The UE 602 may also combine the measurement of the RSS with a paging signal or a wake-up signal detection of the UE 602. For example, the wireless communication device 1400 may select a tracking loop for receiving and measuring the RSS based on a received measurement object. As another aspect, the wireless communication device 1400 may measure the RSS using one or more resource elements and/or one or more slots based on a received measurement object. As yet another aspect, the wireless communication device 1400 may measure an RSS and provide the measurement of the RSS to the scheduling entity in accordance with a measurement report. The measurement performing circuitry 1444 shown and described herein in connection with FIG. 14 may perform the measurement of the RSS.

At block 1506, the wireless communication device 1400 may utilize a communication link with a RAN node based on the measurement of the RSS. In some examples, utilizing a communication link with the RAN node based on the measurement may include at least one of the wireless communication device 1400 transmitting a measurement report, such as a CSI report, generated based on the RSS measurement(s) to the RAN node, the wireless communication device 1400 adjusting tracking loops based on the measurement, or the wireless communication device 1400 updating one or more reception or transmission parameters based on the measurement. In some examples, utilizing a communication link with the RAN node based on the measurement may include the wireless communication device 1400 adjusting tracking loops of the wireless communication device based on the measurement. Examples of tracking loops may include time tracking loops (TTLs), frequency tracking loops (FTLs), power delay profile estimation loops, and/or automatic gain control (AGC) loops. In some examples, utilizing a communication link with the RAN node based on the measurement may include the wireless communication device updating one or more receiving or transmitting parameters of the UE. The communication link utilization circuitry 1446, together with the transceiver 1410, shown and described above in connection with FIG. 14 may utilize a communication link.

Figure 16:
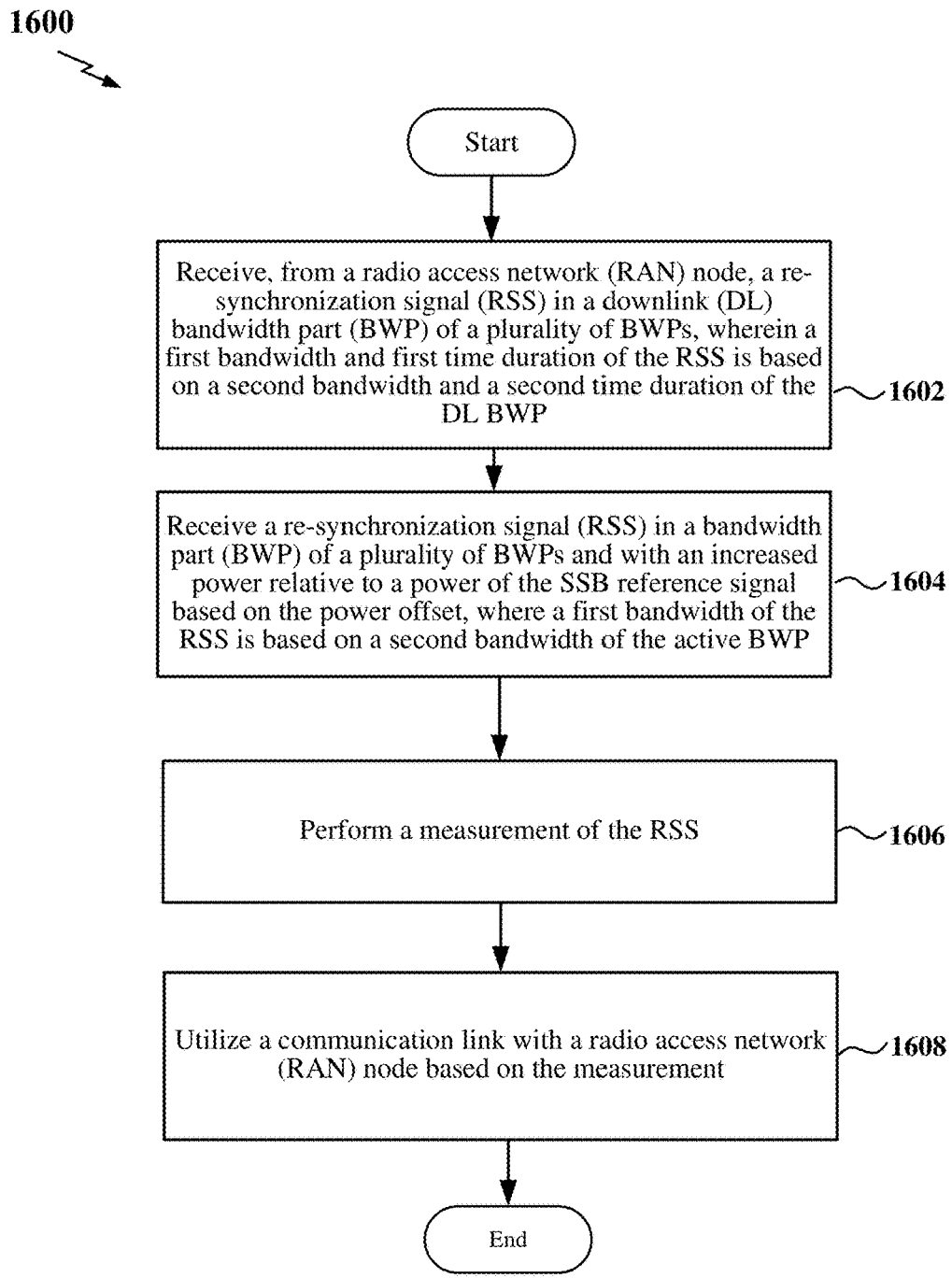
FIG. 16 is a flow chart of a method of receiving and utilizing an RSS in a wireless communication system according to some aspects.

FIG. 16 is a flow chart 1600 of a method of receiving and utilizing an RSS in a wireless communication system according to some aspects. As described below, some or all illustrated features may be omitted in a particular implementation within the scope of the present disclosure, and some illustrated features may not be required for implementation of all aspects. In some examples, the method may be performed by the wireless communication device 1400, as described above and illustrated in FIG. 14, by a processor or processing system, or by any suitable means for carrying out the described functions.

At block 1602, the wireless communication device 1400 may receive at least one of an SIB message or an RRC message identifying a power offset of the RSS with respect to a synchronization signal block (SSB) reference signal. For example, before the wireless communication device 1400 receives an RSS in the active BWP of the plurality of BWPs, the wireless communication device 1400 may receive at least one of a system information block (SIB) message or a radio resource control (RRC) message identifying a power offset of the RSS with respect to a synchronization signal block (SSB) reference signal. The wireless communication device 1400 may subsequently receive the RSS in the active BWP of the plurality of BWPs and with an increased power relative to a power of the SSB reference signal based on the power offset. The receiving circuitry 1442, together with the transceiver 1410, shown and described herein and in connection with FIG. 14 may receive at least one of an SIB message or an RRC message identifying a power offset of the RSS with respect to a synchronization signal block (SSB) reference signal. In some aspects, the power offset may indicated in SI or by dedicated RRC signaling.

At block 1604, the wireless communication device 1400 may receive the RSS in the active BWP and with an increased power relative to a power of the SSB reference signal based on the power offset, where a first bandwidth of the RSS is based on a second bandwidth of the active BWP. In addition, the features described herein with respect to block 1604 may include one or more of the same or similar features described herein with respect to block 1502 of flow chart 1500 illustrated in FIG. 15. The receiving circuitry 1442, together with the transceiver 1410, shown and described herein and in connection with FIG. 14 may receive the RSS.

At block 1606, the wireless communication device 1400 may perform a measurement of the RSS. The features described herein with respect to block 1606 may include one or more of the same or similar features described herein with respect to block 1504 of flow chart 1500 illustrated in FIG. 15.

At block 1608, the wireless communication device 1400 may utilize a communication link with the RAN node based on the measurement of the RSS. The features described herein with respect to block 1608 may include one or more of the same or similar features described herein with respect to block 1506 of flow chart 1500 illustrated in FIG. 15.

In one configuration, the wireless communication device 1400 may include means for performing the various functions and processes described in relation to FIGS. 1-6, 12, 13, 15, and/or 16. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-6, 12, 13, 15, and/or 16.

Aspect 1: A user equipment (UE) may receive, from a radio access network (RAN) node, a re-synchronization signal (RSS) in a downlink (DL) bandwidth part (BWP) of a plurality of BWPs. A first bandwidth and first time duration of the RSS is based on a second bandwidth and a second time duration of the DL BWP. The UE may also perform a measurement of the RSS. The UE may further utilize a communication link with the RAN node based on the measurement.

Aspect 2: The UE of aspect 1, wherein the utilizing the communication link with the RAN node based on the measurement may comprise one or more of receiving a measurement object and a measurement report configuration for the RSS, transmitting a measurement report obtained from the measurement to the RAN node, adjusting tracking loops of the UE based on the measurement, or updating one or more reception or transmission parameters of the UE based on the measurement.

Aspect 3: The UE of aspect 1, wherein after the performing the measurement of the RSS, the UE may further utilize the measurement of the RSS for radio resource management (RRM) or radio link monitoring in different radio resource control (RRC) states of the UE based on a measurement object and measurement report configuration, and combine the measurement of the RSS with a paging signal or a wake-up signal detection of the UE.

Aspect 4: The UE of aspect 1, wherein the receiving the RSS in the active BWP may comprise receiving the RSS in a single symbol of the active BWP.

Aspect 5: The UE of aspect 1, the receiving the RSS in the active BWP comprises receiving the RSS in multiple symbols of the active BWP. The multiple symbols may span one or more slots of the active BWP.

Aspect 6: The UE of aspect 1, the receiving the RSS in the downlink BWP may comprise receiving the RSS in a set of consecutive resource blocks (RB) configured by the RAN node, and receiving the RSS on a set of symbols within a set of slots configured by the RAN node.

Aspect 7: The UE of aspect 6, the RSS and two adjacent guard bands may occupy the second bandwidth of the active BWP.

Aspect 8: The UE of aspect 1, the receiving the RSS in the active BWP may comprise receiving the RSS in a group of consecutive resource blocks (RBs) aligned with a center RB of the active BWP.

Aspect 9: The UE of aspect 1, the receiving the RSS in the active BWP may comprise receiving the RSS in a group of consecutive resource blocks (RBs) aligned with a pre-configured frequency raster associated with the active BWP.

Aspect 10: The UE of aspect 1, the first bandwidth of the RSS may be scalable in proportion to the second bandwidth of the active BWP.

Aspect 11: The UE of aspect 1, the UE may further receive at least one of a system information block (SIB) message or a radio resource control (RRC) message identifying a power offset of the RSS with respect to a synchronization signal block (SSB) reference signal, receive the RSS with an increased power relative to a power of the SSB reference signal based on the power offset, receive at least one of a SIB message or an RRC message indicating a time and frequency configuration of the RSS, and receive the RSS based on a time and frequency configuration indicated in the SIB message or the RRC message.

Aspect 12: The UE of aspect 11, the power offset is received via system information (SI) or via a dedicated radio resource control (RRC) signal.

Aspect 13: The UE of aspect 1, the receiving the RSS in the downlink BWP may comprise receiving the RSS on one or more RSS beams periodically or semi-statically in at least one RSS slot of a plurality of RSS slots, wherein a periodicity and a time offset of each RSS slot of the plurality of RSS slots associated with a reception of each RSS beam of the one or more RSS beams is pre-configured by the RAN node and received via a system information (SI) or a dedicated RRC signal.

Aspect 14: The UE of aspect 13, the one or more RSS beams may be received periodically or semi-statically, and the periodicities of the receptions of the one or more RSS beams may be pre-configured by the RAN node and received via system information (SI) or a dedicated radio resource control (RRC) signal.

Aspect 15: The UE of aspect 14, the one or more RSS beams may comprise at least a first RSS beam and a second RSS beam, the RSS may comprise at least a first RSS sequence and a second RSS sequence, the first RSS sequence may be received in the first RSS beam, and the second RSS sequence may be received in the second RSS beam.

Aspect 16: The UE of aspect 15, each of the first RSS sequence and the second RSS sequence may comprise a base RSS sequence, and the base RSS sequence may be a function of a cell identifier (ID) of the RAN node and may be based on a primary synchronization signal (PSS) and a secondary synchronization signal (SSS).

Aspect 17: The UE of aspect 16, the first RSS sequence may comprise a first sequence comprising the base RSS sequence scrambled with a first beam-dependent scrambling sequence associated with the first RSS beam, and the second RSS sequence may comprise a second sequence comprising the base RSS sequence scrambled with a second beam-dependent scrambling sequence associated with the second RSS beam.

Aspect 18: The UE of aspect 17, the first RSS sequence may comprise a first quadrature phase shift keying (QPSK) sequence based on the first sequence, and the second RSS sequence may comprise a second QPSK sequence based on the second sequence.

Aspect 19: The UE of aspect 16, the base RSS sequence may comprise the PSS interleaved with the SSS, the base RSS sequence may comprise a weighted combination of the PSS and SSS, or the base RSS sequence may comprise the PSS multiplexed with the SSS.

Aspect 20: The UE of aspect 19, the base RSS sequence may comprise a first base RSS sequence associated with the first RSS sequence and a second base RSS sequence associated with the second RSS sequence, the first base RSS sequence may comprise a first cyclic shift of the combination of the PSS and the SSS, the second base RSS sequence may comprise a second cyclic shift of the combination of the PSS and the SSS, the first cyclic shift may be associated with the first RSS beam, and the second cyclic shift may be associated with the second RSS beam.

Aspect 21: The UE of aspect 15, each of the first RSS sequence and the second RSS sequence may comprise a base RSS sequence, and the base RSS sequence may comprise only one of a primary synchronization signal (PSS) or a secondary synchronization signal (SSS).

Aspect 22: The UE of aspect 13, each of the one or more RSS beams may be quasi co-located with a respective synchronization signal block (SSB) beam or a channel state information reference signal (CSI-RS) beam.

Aspect 23: The UE of aspect 13, the receiving the RSS on the one or more RSS beams may comprise receiving repetitions of the RSS on a same RSS beam of the one or more RSS beams in an RSS slot of a plurality of RSS slots, wherein each of the repetitions may be time-division multiplexed in the RSS slot, and wherein the repetitions of the reception of the RSS may be received in consecutive symbols of the RSS slot.

Aspect 24: The UE of aspect 23, the receiving the repetitions of the RSS may comprise receiving the repetitions of the RSS in consecutive symbols of the RSS slot.

Aspect 25: The UE of aspect 24, each of the repetitions of the RSS may comprise the RSS or a conjugate of the RSS based on a binary cover code.

Aspect 26: The UE of aspect 13, the receiving the RSS on the one or more RSS beams may comprise receiving the RSS in at least one RSS slot of a plurality of slots.

Aspect 27: The UE of aspect 26, the at least one RSS slot may be pre-configured for the active BWP.

Aspect 28: The UE of aspect 26, the UE may further receive at least one of a system information block (SIB) message or a radio resource control (RRC) message identifying the at least one RSS slot for the active BWP.

Aspect 29: The UE of aspect 26, the RSS may comprise a plurality of RSSs that are either orthogonal or quasi-orthogonal and that are multiplexed in a time domain, a frequency domain, a code domain, or a space domain, the plurality of RSSs may comprise a plurality of RSS beams, and the receiving the plurality of RSSs in the downlink BWP may comprise receiving the plurality of RSSs in at least one RSS slot across the plurality of RSS beams, each of the plurality of RSSs may be received on one RSS beam of the plurality of RSS beams.

Aspect 30: The UE of aspect 11, the active BWP may exclude a synchronous signal block (SSB).

Aspect 31: The UE of aspect 11, the UE may further identify another active BWP of the plurality of BWPs, switch from the active BWP to the other active BWP based on dynamic signaling, a semi-statically configured time, or RRC signaling, and receive another RSS of the other active BWP.

Aspect 32: A Radio Access Network (RAN) node may generate a re-synchronization signal (RSS) for a bandwidth part (BWP) of a plurality of BWPs. The RAN node may also transmit the RSS in the BWP of a downlink (DL) to a user equipment (UE), wherein a first bandwidth of the RSS is based on a second bandwidth of the BWP. A first bandwidth of the RSS may be based on a second bandwidth of the active BWP. The UE may further utilize a communication link with the UE based on the RSS, wherein the utilizing the communication link with the UE based on the RSs comprises at least one of receiving, from the UE, a measurement report based on a measurement of the RSS, receiving, from the UE, an indication of an adjustment of a tracking loop based on the measurement of the RSS, or receiving, from the UE, an indication of an update of one or more reception or transmission parameters based on the measurement of the RSS.

Aspect 33: The RAN node of aspect 32, the utilizing the communication link with the UE and based on the RSS may comprise one or more of receiving a measurement report obtained from a measurement based on the RSS and from the UE, receiving an indication of an adjustment of tracking loops obtained from the measurement based on the RSS from the UE, or receiving an indication of an update of one or more reception or transmission parameters of the UE obtained from the measurement based on the RSS from the UE.

Aspect 34: The RAN node of aspect 32, a time duration of the RSS may be based on an active time of the active downlink BWP.

Aspect 35: The RAN node of aspect 32, the transmitting the RSS in the active BWP may comprise transmitting the RSS in a single symbol of the active BWP.

Aspect 36: The RAN node of aspect 32, the transmitting the RSS in the active BWP may comprise transmitting the RSS in multiple symbols of the active BWP. The multiple symbols may span one or more slots of the active BWP.

Aspect 37: The RAN node of aspect 32, the transmitting the RSS in the active BWP may comprise transmitting the RSS in a center resource block (RB) of the active BWP.

Aspect 38: The RAN node of aspect 37, the RSS and two adjacent guard bands may occupy the second bandwidth of the active BWP.

Aspect 39: The RAN node of aspect 32, the transmitting the RSS in the active BWP may comprise transmitting the RSS in a group of consecutive resource blocks (RBs) aligned with a center RB of the active BWP.

Aspect 40: The RAN node of aspect 32, the transmitting the RSS in the active BWP may comprise transmit the RSS in a group of consecutive resource blocks (RBs) aligned with a pre-configured frequency raster associated with the active BWP.

Aspect 41: The RAN node of aspect 32, the first bandwidth of the RSS may be scalable in proportion to the second bandwidth of the active BWP.

Aspect 42: The RAN node of aspect 32, the RAN entity may further transmit at least one of a system information block (SIB) message or a radio resource control (RRC) message identifying at least a time and frequency resource configuration, a power offset, and a quasi co-location (QCL) relationship of the RSS with respect to a synchronization signal block (SSB) reference signal, transmit the RSS on the time and frequency resources pre-configured for one or more UEs, transmit the RSS with an increased power relative to a power of the SSB reference signal based on the power offset, transmit one or more RSS beams based on the QCL relationship with the SSB reference signal, and transmit a measurement object and a measurement report configuration of the RSS to the UE.

Aspect 43: The RAN node of aspect 42, the power offset may be transmitted via system information (SI) or via a dedicated radio resource control (RRC) signal.

Aspect 44: The RAN node of aspect 32, the transmitting the RSS in the active BWP may comprise transmit the RSS on one or more RSS beams.

Aspect 45: The RAN node of aspect 44, the one or more RSS beams may be transmitted periodically or semi-statically, and the periodicities of the transmission of the one or more RSS beams may be pre-configured by the RAN node and transmitted via system information (SI) or a dedicated radio resource control (RRC) signal.

Aspect 46: The RAN node of aspect 44, the one or more RSS beams may comprise at least a first RSS beam and a second RSS beam.

Aspect 47: The RAN node of aspect 46, the generating the RSS for the active BWP of the plurality of BWPs may comprise generating at least a first RSS sequence and a second RSS sequence, and the transmitting the RSS in the active BWP may comprise transmitting the first RSS sequence in the first RSS beam and transmitting the second RSS sequence in the second RSS beam.

Aspect 48: The RAN node of aspect 46, wherein the one or more RSS beams may comprise at least a first RSS sequence, a second RSS sequence, and a base RSS sequence for the first RSS sequence and the second RSS sequence, wherein the base RSS sequence may comprise a combination of a primary synchronization signal (PSS) and a secondary synchronization signal (SSS).

Aspect 49: The RAN node of aspect 48, the generating at least the first RSS sequence and the second RSS sequence may comprise scrambling the base RSS sequence with a first beam-dependent scrambling sequence associated with the first RSS beam to form a first sequence, and scrambling the base RSS sequence with a second beam-dependent scrambling sequence associated with the second RSS beam to form a second sequence.

Aspect 50: The RAN node of aspect 49, the generating at least the first RSS sequence and the second RSS sequence may comprise initializing a pseudo-random number (PN) sequence generator with a cell identifier (ID) of a cell associated with the RAN node and a first beam index of the first RSS beam to generate the first beam-dependent scrambling sequence having a sequence bandwidth that is twice the first bandwidth of the RSS, and initializing the PN sequence generator with the cell ID and a second beam index of the second RSS beam to generate the second beam-dependent scrambling sequence having the sequence bandwidth.

Aspect 51: The RAN node of aspect 49, the generating at least the first RSS sequence and the second RSS sequence may comprise initializing a pseudo-random number (PN) sequence generator with a cell identifier (ID) of a cell associated with the RAN node to generate an extended scrambling sequence comprising the first beam-dependent scrambling sequence and the second beam-dependent scrambling sequence, each having a sequence bandwidth that is twice the first bandwidth of the RSS.

Aspect 52: The RAN node of aspect 51, he extended scrambling sequence may comprise a plurality of segments, each associated with a respective one of a plurality of RSS beams including the first beam and the second beam.

Aspect 53: The RAN node of aspect 49, the first sequence and the second sequence may each comprise a sequence bandwidth that is twice the first bandwidth of the RSS, and the generating at least the first RSS sequence and the second RSS sequence may comprise modulating the first sequence using quadrature phase shift keying to form a first QPSK sequence corresponding to the first RSS sequence and comprising the first bandwidth, and modulating the second sequence using QPSK to form a second QPSK sequence corresponding to the second RSS sequence and comprising the first bandwidth.

Aspect 54: The RAN node of aspect 53, the first QPSK sequence may comprise first in-phase components and first quadrature-phase components, the first in-phase components comprising even indexed elements of the first sequence and the first quadrature-phase components comprising odd indexed elements of the first sequence, and the second QPSK sequence may comprise second in-phase components and second quadrature-phase components, the second in-phase components comprising even indexed elements of the first sequence and the second quadrature-phase components comprising odd indexed elements of the first sequence.

Aspect 55: The RAN node of aspect 48, the generating the base RSS sequence for the first RSS sequence and the second RSS sequence may comprise interleaving the PSS with the SSS to produce the combination of the PSS and the SSS, or multiplexing the PSS with the SSS to produce the combination of the PSS and the SSS.

Aspect 56: The RAN node of aspect 55, the generating the base RSS sequence for the first RSS sequence and the second RSS sequence may comprise applying a first cyclic shift associated with the first RSS beam to the combination of the PSS and the SSS to produce a first base RSS sequence for the first RSS sequence, and applying a second cyclic shift associated with the second RSS beam to the combination of the PSS and SSS to produce a second base RSS sequence for the second RSS sequence.

Aspect 57: The RAN node of aspect 44, the transmitting the RSS on one or more RSS beams may comprise quasi co-locating each of the one or more RSS beams with a respective synchronization signal block (SSB) beam.

Aspect 58: The RAN node of aspect 47, each of the first RSS sequence and the second RSS sequence may comprise a base RSS sequence, and the base RSS sequence may comprise only one of a primary synchronization signal (PSS) or a secondary synchronization signal (SSS).

Aspect 59: The RAN node of aspect 44, the transmitting the RSS on the one or more RSS beams may comprise applying a binary cover code for each repetition of a transmission of the RSS, generating the RSS or a conjugate of the RSS for each repetition of the transmission of the RSS based on the binary cover code, transmitting repetitions of the RSS on a same RSS beam of the one or more RSS beams in an RSS slot of a plurality of RSS slots, each of the repetitions being time-division multiplexed in the RSS slot, and transmitting the RSS in at least one slot of a plurality of slots.

Aspect 60: The RAN node of aspect 59, the transmitting the repetitions of the RSS may comprise transmitting the repetitions of the RSS in consecutive symbols of the RSS slot.

Aspect 61: The RAN node of aspect 59, the generating the RSS for the active BWP of the plurality of BWPs may comprise applying a binary cover code for each of the repetitions of the RSS, and generating the RSS or a conjugate of the RSS for each of the repetitions of the RSS based on the binary code cover.

Aspect 62: The RAN node of aspect 59, the transmitting the RSS on the one or more RSS beams may comprise transmitting the RSS in at least one RSS slot of a plurality of slots.

Aspect 63: The RAN node of aspect 62, the at least one RSS slot may be pre-configured for the active BWP.

Aspect 64: The RAN node of aspect 62, the RAN entity may further transmit at least one of a system information block (SIB) message or a radio resource control (RRC) message identifying the at least one RSS slot for the active BWP.

Aspect 65: The RAN node of aspect 62, the RSS comprises a plurality of RSSs, the one or more RSS beams comprise a plurality of RSS beams, and the transmitting the RSS in the at least one RSS slot may comprise transmitting the plurality of RSSs in the at least one RSS slot across the plurality of RSS beams, each of the plurality of RSSs being transmitted on one of the plurality of RSS beams.

Aspect 66: The RAN node of aspect 32, the active BWP may exclude a synchronous signal block (SSB).

In one configuration, a user equipment (UE) may include means for receiving, from a radio access network (RAN) node, a re-synchronization signal (RSS) in an active downlink bandwidth part (BWP) of a plurality of BWPs, wherein a first bandwidth of the RSS is based on a second bandwidth of the active downlink BWP, means for performing a measurement of the RSS, and means for utilizing a communication link with the RAN node based on the measurement.

In one aspect, the aforementioned means for receiving, from a radio access network (RAN) node, a re-synchronization signal (RSS) in an active downlink bandwidth part (BWP) of a plurality of BWPs, wherein a first bandwidth of the RSS is based on a second bandwidth of the active downlink BWP, means for performing a measurement of the RSS, and means for utilizing a communication link with the RAN node based on the measurement may be the processor(s) 1404 shown in FIG. 14 configured to perform the functions recited by the aforementioned means. For example, the aforementioned means for receiving, from a radio access network (RAN) node, a re-synchronization signal (RSS) in an active downlink bandwidth part (BWP) of a plurality of BWPs, wherein a first bandwidth of the RSS is based on a second bandwidth of the active downlink BWP may include the receiving circuitry 1442 together with the transceiver 1410 in FIG. 14. As another example, the aforementioned means for performing a measurement of the RSS may include the measurement performance circuitry 1444 shown in FIG. 14. As yet another example, the aforementioned means for utilizing a communication link with the RAN node based on the measurement may include the communication link utilization circuitry 1446 shown in FIG. 14. In another aspect, the aforementioned means may be a circuit or any apparatus configured to perform the functions recited by the aforementioned means.

In one configuration, a radio access network (RAN) node may include means for generating a re-synchronization signal (RSS) for an active bandwidth part (BWP) of a plurality of BWPs, means for transmitting the RSS in the active BWP to a user equipment (UE), wherein a first bandwidth of the RSS is based on a second bandwidth of the active BWP, and means for utilizing a communication link with the UE based on the RSS.

In one aspect, the aforementioned means for generating a re-synchronization signal (RSS) for an active bandwidth part (BWP) of a plurality of BWPs, means for transmitting the RSS in the active BWP to a user equipment (UE), wherein a first bandwidth of the RSS is based on a second bandwidth of the active BWP, and means for utilizing a communication link with the UE based on the RSS may be the processor(s) 1104 shown in FIG. 11 configured to perform the functions recited by the aforementioned means. For example, the aforementioned means for generating a re-synchronization signal (RSS) for an active bandwidth part (BWP) of a plurality of BWPs may include the reference signal generating circuitry 1142 shown in FIG. 11. As another example, the aforementioned means for transmitting the RSS in the active BWP to a user equipment (UE), wherein a first bandwidth of the RSS is based on a second bandwidth of the active BWP may include the transmitting circuitry 1144 together with the transceiver 1110 shown in FIG. 11. As another example, the aforementioned means for utilizing a communication link with the UE based on the RSS may include the communication link utilization circuitry 1146 shown in FIG. 11. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a wireless communication network, the method comprising:
    receiving, from a radio access network (RAN) node, a re-synchronization signal (RSS) in a downlink (DL) bandwidth part (BWP) within which synchronization signal blocks (SSBs) are not transmitted by the RAN node, the RSS having a first bandwidth that is scaled according to a second bandwidth of the DL BWP relative to another DL BWP within which SSBs are transmitted by the RAN node;
    performing a measurement of the RSS; and
    utilizing a communication link with the RAN node based on the measurement.

2. The method of claim 1, wherein the utilizing the communication link with the RAN node based on the measurement comprises one or more of:
    receiving a measurement object and a measurement report configuration for the RSS;
    transmitting a measurement report obtained from the measurement to the RAN node;
    adjusting tracking loops of the UE based on the measurement; or
    updating one or more reception or transmission parameters of the UE based on the measurement.

3. The method of claim 1, wherein after the performing the measurement of the RSS, the method further comprises:
    utilizing the measurement of the RSS for radio resource management (RRM) or radio link monitoring in different radio resource control (RRC) states of the UE based on a measurement object and a measurement report configuration; and
    combining the measurement of the RSS with a paging signal or a wake-up signal detection of the UE.

4. The method of claim 1, wherein the receiving the RSS in the downlink BWP comprises:
    receiving the RSS in a set of consecutive resource blocks (RB) configured by the RAN node; and
    receiving the RSS on a set of symbols within a set of slots configured by the RAN node.

5. The method of claim 1, further comprising at least one of:
    receiving at least one of a system information block (SIB) message or a radio resource control (RRC) message identifying a power offset of the RSS with respect to a synchronization signal block (SSB) reference signal, and
    receiving the RSS with an increased power relative to a power of the SSB reference signal based on the power offset; or
    receiving at least one of a SIB message or an RRC message indicating a time and frequency configuration of the RSS, and
    receiving the RSS based on a time and frequency configuration indicated in the SIB message or the RRC message.

6. The method of claim 1, wherein the receiving the RSS in the downlink BWP comprises:
    receiving the RSS on one or more RSS beams periodically or semi-statically in at least one RSS slot of a plurality of RSS slots, wherein a periodicity and a time offset of each RSS slot of the plurality of RSS slots associated with a reception of each RSS beam of the one or more RSS beams is pre-configured by the RAN node and received via a system information (SI) or a dedicated RRC signal.

7. The method of claim 6, wherein:
    the one or more RSS beams comprise at least a first RSS beam and a second RSS beam,
    the RSS comprises at least a first RSS sequence and a second RSS sequence,
    the first RSS sequence is received in the first RSS beam, and
    the second RSS sequence is received in the second RSS beam.

8. The method of claim 7, wherein:
each of the first RSS sequence and the second RSS sequence comprises a base RSS sequence, and
the base RSS sequence is a function of a cell identifier (ID) of the RAN node and is based on a primary synchronization signal (PSS) and a secondary synchronization signal (SSS).

9. The method of claim 8, wherein:
the first RSS sequence comprises a first sequence comprising the base RSS sequence scrambled with a first beam-dependent scrambling sequence associated with the first RSS beam, and
the second RSS sequence comprises a second sequence comprising the base RSS sequence scrambled with a second beam-dependent scrambling sequence associated with the second RSS beam.

10. The method of claim 8, wherein:
the base RSS sequence comprises the PSS interleaved with the SSS;
the base RSS sequence comprises a weighted combination of the PSS and SSS; or
the base RSS sequence comprises the PSS multiplexed with the SSS.

11. The method of claim 10, wherein:
the base RSS sequence comprises a first base RSS sequence associated with the first RSS sequence and a second base RSS sequence associated with the second RSS sequence;
the first base RSS sequence comprises a first cyclic shift of the combination of the PSS and the SSS;
the second base RSS sequence comprises a second cyclic shift of the combination of the PSS and the SSS;
the first cyclic shift is associated with the first RSS beam; and
the second cyclic shift is associated with the second RSS beam.

12. The method of claim 6, wherein each of the one or more RSS beams is quasi co-located with a respective synchronization signal block (SSB) beam or a channel state information reference signal (CSI-RS) beam.

13. The method of claim 6, wherein the receiving the RSS on the one or more RSS beams comprises:
receiving repetitions of the RSS on a same RSS beam of the one or more RSS beams in an RSS slot of a plurality of RSS slots, wherein each of the repetitions are time-division multiplexed in the RSS slot, and wherein the repetitions of the reception of the RSS are received in consecutive symbols of the RSS slot.

14. The method of claim 13, wherein each of the repetitions of the RSS comprises the RSS or a conjugate of the RSS based on a binary cover code.

15. The method of claim 1, wherein:
the RSS comprises a plurality of RSSs that are either orthogonal or quasi-orthogonal and that are multiplexed in a time domain, a frequency domain, a code domain, or a space domain;
the plurality of RSSs comprises a plurality of RSS beams; and
the receiving the plurality of RSSs in the downlink BWP comprises:
receiving the plurality of RSSs in at least one RSS slot across the plurality of RSS beams, each of the plurality of RSSs being received on one RSS beam of the plurality of RSS beams.

16. The method of claim 1, further comprising:
identifying another active BWP of the plurality of BWPs;
switching from the active BWP to the other active BWP based on dynamic signaling, a semi-statically configured time, or RRC signaling; and
receiving another RSS of the other active BWP.

17. The method of claim 1, wherein the RSS has a first time duration that is based on an active time duration of the DL BWP.

18. A method for wireless communication at a Radio Access Network (RAN) node in a wireless communication network, the method comprising:
transmitting, to a user equipment (UE), a re-synchronization signal (RSS) in a downlink (DL) bandwidth part (BWP) within which synchronization signal blocks (SSBs) are not transmitted by the RAN node, the RSS having a first bandwidth that is scaled according to a second bandwidth of the DL BWP relative to another DL BWP within which SSBs are transmitted by the RAN node; and
utilizing a communication link with the UE based on the RSS, wherein the utilizing the communication link with the UE based on the RSs comprises at least one of:
receiving, from the UE, a measurement report based on a measurement of the RSS,
receiving, from the UE, an indication of an adjustment of a tracking loop based on the measurement of the RSS, or
receiving, from the UE, an indication of an update of one or more reception or transmission parameters based on the measurement of the RSS.

19. The method of claim 18, further comprising:
transmitting at least one of a system information block (SIB) message or a radio resource control (RRC) message identifying at least a time and frequency resource configuration, a power offset, and a quasi co-location (QCL) relationship of the RSS with respect to a synchronization signal block (SSB) reference signal;
transmitting the RSS on the time and frequency resources pre-configured for one or more UEs;
transmitting the RSS with an increased power relative to a power of the SSB reference signal based on the power offset;
transmitting one or more RSS beams based on the QCL relationship with the SSB reference signal; and
transmitting a measurement object and measurement report configuration of the RSS to the UE.

20. The method of claim 19, wherein the one or more RSS beams comprise at least a first RSS sequence, a second RSS sequence, and a base RSS sequence for the first RSS sequence and the second RSS sequence, wherein the base RSS sequence comprises a combination of a primary synchronization signal (PSS) and a secondary synchronization signal (SSS).

21. The method of claim 20, wherein:
the generating at least the first RSS sequence and the second RSS sequence comprises:
scrambling the base RSS sequence with a first beam-dependent scrambling sequence associated with a first RSS beam to form a first sequence, and
scrambling the base RSS sequence with a second beam-dependent scrambling sequence associated with a second RSS beam to form a second sequence.

22. The method of claim 21, wherein:
the generating at least the first RSS sequence and the second RSS sequence comprises:
initializing a pseudo-random number (PN) sequence generator with a cell identifier (ID) of a cell associated with the RAN node and a first beam index of the first RSS beam to generate the first beam-dependent scrambling sequence having a sequence bandwidth that is twice the first bandwidth of the RSS; and initializing the PN sequence generator with the cell ID and a second beam index of the second RSS beam to generate the second beam-dependent scrambling sequence having the sequence bandwidth.

23. The method of claim 21, wherein the generating at least the first RSS sequence and the second RSS sequence comprises:

initializing a pseudo-random number (PN) sequence generator with a cell identifier (ID) of a cell associated with the RAN node to generate an extended scrambling sequence comprising the first beam-dependent scrambling sequence and the second beam-dependent scrambling sequence, each having a sequence bandwidth that is twice the first bandwidth of the RSS.

24. The method of claim 23, wherein the extended scrambling sequence comprises a plurality of segments, each associated with a respective one of a plurality of RSS beams including the first RSS beam and the second RSS beam.

25. The method of claim 21, wherein:

the first sequence and the second sequence each comprise a sequence bandwidth that is twice the first bandwidth of the RSS, and the generating at least the first RSS sequence and the second RSS sequence comprises:

modulating the first sequence using quadrature phase shift keying to form a first QPSK sequence corresponding to the first RSS sequence and comprising the first bandwidth; and modulating the second sequence using QPSK to form a second QPSK sequence corresponding to the second RSS sequence and comprising the first bandwidth.

26. The method of claim 25, wherein:

the first QPSK sequence comprises first in-phase components and first quadrature-phase components, the first in-phase components comprising even indexed elements of the first sequence and the first quadrature-phase components comprising odd indexed elements of the first sequence, and the second QPSK sequence comprises second in-phase components and second quadrature-phase components, the second in-phase components comprising even indexed elements of the first sequence and the second quadrature-phase components comprising odd indexed elements of the first sequence.

27. The method of claim 20, wherein:

the generating the base RSS sequence for the first RSS sequence and the second RSS sequence comprises:

interleaving the PSS with the SSS to produce the combination of the PSS and the SSS, or multiplexing the PSS with the SSS to produce the combination of the PSS and the SSS.

28. The method of claim 27, wherein:

the generating the base RSS sequence for the first RSS sequence and the second RSS sequence comprises:

applying a first cyclic shift associated with a first RSS beam to the combination of the PSS and the SSS to produce a first base RSS sequence for the first RSS sequence, and applying a second cyclic shift associated with a second RSS beam to the combination of the PSS and SSS to produce a second base RSS sequence for the second RSS sequence.

29. The method of claim 18, wherein the transmitting the RSS on the one or more RSS beams comprises:

applying a binary cover code for each repetition of a transmission of the RSS;

generating the RSS or a conjugate of the RSS for each repetition of the transmission of the RSS based on the binary cover code;

transmitting repetitions of the RSS on a same RSS beam of the one or more RSS beams in an RSS slot of a plurality of RSS slots, each of the repetitions being time-division multiplexed in the RSS slot; and transmitting the RSS in at least one slot of a plurality of slots.

30. The method of claim 18, wherein the RSS has a first time duration that is based on an active time duration of the DL BWP.

31. A wireless communication device in a radio access network (RAN) of a wireless communication system, comprising:

a wireless transceiver;

a memory; and a processor communicatively coupled to the wireless transceiver and the memory, wherein the processor and the memory are configured to:

receive, from a radio access network (RAN) node, a re-synchronization signal (RSS) in a downlink (DL) bandwidth part (BWP) within which synchronization signal blocks (SSBs) are not transmitted by the RAN node, the RSS having a first bandwidth that is scaled according to a second bandwidth of the DL BWP relative to another DL BWP within which SSBs are transmitted by the RAN node;

perform a measurement of the RSS; and utilize a communication link with the RAN node based on the measurement.

32. The wireless communication device of claim 31, wherein the RSS has a first time duration that is based on an active time duration of the DL BWP.

33. A radio access network (RAN) node in a wireless communication system, comprising:

a wireless transceiver;

a memory; and a processor communicatively coupled to the wireless transceiver and the memory, wherein the processor and the memory are configured to:

transmit, to a user equipment (UE), a re-synchronization signal (RSS) in a downlink (DL) bandwidth part (BWP) within which synchronization signal blocks (SSBs) are not transmitted by the RAN node, the RSS having a first bandwidth that is scaled according to a second bandwidth of the DL BWP relative to another DL BWP within which SSBs are transmitted by the RAN node; and utilize a communication link with the UE based on the RSS, wherein utilizing the communication link with the UE based on the RSS comprises at least one of:

receiving, from the UE, a measurement report based on a measurement of the RSS, receiving, from the UE, an indication of an adjustment of a tracking loop based on the measurement of the RSS, or receiving, from the UE, an indication of an update of one or more reception or transmission parameters based on the measurement of the RSS.

34. The RAN node of claim 33, wherein the RSS has a first time duration that is based on an active time duration of the DL BWP.

* * * * *